United States Patent
Lee et al.

(10) Patent No.: US 12,032,186 B2
(45) Date of Patent: Jul. 9, 2024

(54) SPECTRAL FILTER, AND IMAGE SENSOR AND ELECTRONIC DEVICE INCLUDING SPECTRAL FILTER

(71) Applicant: SAMSUNG ELECTRONICS CO., LTD., Suwon-si (KR)

(72) Inventors: Jaesoong Lee, Suwon-si (KR); Hyochul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/727,329

(22) Filed: Apr. 22, 2022

(65) Prior Publication Data

US 2022/0342129 A1 Oct. 27, 2022

(30) Foreign Application Priority Data

Apr. 22, 2021 (KR) .................. 10-2021-0052531
Mar. 15, 2022 (KR) .................. 10-2022-0032230

(51) Int. Cl.
*H04N 5/335* (2011.01)
*G02B 5/28* (2006.01)
*H04N 23/55* (2023.01)
*H04N 25/11* (2023.01)

(52) U.S. Cl.
CPC .............. *G02B 5/28* (2013.01); *H04N 23/55* (2023.01); *H04N 25/11* (2023.01)

(58) Field of Classification Search
CPC .......................................................... G02B 5/28
See application file for complete search history.

(56) References Cited

U.S. PATENT DOCUMENTS

| 5,726,805 A * | 3/1998 | Kaushik .................. G02B 5/201 359/590 |
| 6,768,555 B2 | 7/2004 | Chen et al. |
| 9,658,372 B2 | 5/2017 | Frey et al. |
| 2014/0134712 A1* | 5/2014 | Na ....................... G01N 21/7746 250/216 |
| 2017/0213994 A1* | 7/2017 | Kim ..................... H10K 59/122 |

(Continued)

FOREIGN PATENT DOCUMENTS

| EP | 3771892 A1 | 2/2021 |
| JP | 2021-519511 A | 8/2021 |

(Continued)

OTHER PUBLICATIONS

Communication dated Oct. 31, 2022 issued by the European Patent Office in European Patent Application No. 22169216.3.

(Continued)

*Primary Examiner* — Gary C Vieaux
(74) *Attorney, Agent, or Firm* — Sughrue Mion, PLLC

(57) ABSTRACT

Provided is a spectral filter, and an image sensor and an electronic device each including the spectral filter. The spectral filter includes a first metal reflection layer and a second metal reflection layer spaced apart from each other, a plurality of cavities disposed between the first metal reflection layer and the second metal reflection layer, and a bandpass filter disposed between the plurality of cavities and selectively transmitting light of a certain wavelength region. Each of the plurality of cavities may have a multi-mode structure having a plurality of central wavelengths.

26 Claims, 27 Drawing Sheets

(56) References Cited

U.S. PATENT DOCUMENTS

| | | | |
|---|---|---|---|
| 2019/0004222 A1* | 1/2019 | Hwang | G01J 3/12 |
| 2019/0016091 A1* | 1/2019 | Lee | B32B 15/04 |
| 2019/0056269 A1 | 2/2019 | Liu et al. | |
| 2020/0403023 A1 | 12/2020 | Huang et al. | |
| 2021/0033466 A1* | 2/2021 | Kim | G01J 3/1895 |
| 2021/0048342 A1* | 2/2021 | Kim | G01J 3/0205 |
| 2022/0003603 A1 | 1/2022 | Seitz et al. | |
| 2022/0342130 A1 | 10/2022 | Kim et al. | |

FOREIGN PATENT DOCUMENTS

| | | |
|---|---|---|
| KR | 10-2019-0100838 A | 8/2019 |
| WO | 2017/000069 A1 | 1/2017 |
| WO | 2019/191543 A1 | 10/2019 |
| WO | 2020/129329 A1 | 6/2020 |

OTHER PUBLICATIONS

Communication issued Aug. 22, 2023 by the Japan Patent Office in Japanese Patent Application No. 2022-070525.

\* cited by examiner

| F1 (UV1) | F6 (B1) | F11 (B4) | F16 (G4) | F21 (G6) |
| F2 (UV2) | F7 (B2) | F12 (B5) | F17 (G5) | F22 (G7) |
| F3 (UV3) | F8 (B3) | F13 (R2) | F18 (R5) | F23 (NIR2) |
| F4 (G1) | F9 (G3) | F14 (R3) | F19 (R6) | F24 (NIR3) |
| F5 (G2) | F10 (R1) | F15 (R4) | F20 (NIR1) | F25 (NIR4) |

(a)

(b)

(c)

(d)

(e)

SPECTRAL FILTER, AND IMAGE SENSOR AND ELECTRONIC DEVICE INCLUDING SPECTRAL FILTER

CROSS-REFERENCE TO RELATED APPLICATIONS

This application is based on and claims priority under 35 U.S.C. § 119 to Korean Patent Application Nos. 10-2021-0052531, filed on Apr. 22, 2021 and 10-2022-0032230 filed on Mar. 15, 2022 in the Korean Intellectual Property Office, the disclosures of which are incorporated by reference herein in their entirety.

BACKGROUND

1. Field

The present disclosure relates to a spectral filter, and an image sensor and an electronic device each including the spectral filter.

2. Description of the Related Art

In related arts, image sensors classify wavelength bands into three sections, i.e., red (R), green (G), and blue (B); however, to improve color expression accuracy and object recognition performance, an image sensor with a spectral filter dividing wavelength bands into more sections needs to be developed. Existing spectral filters have been used for special-purpose cameras which include bulky and complex optical element parts, and research and development in technologies regarding an image sensor with a spectral filter integrated on a semiconductor chip is still ongoing.

SUMMARY

Provided are a spectral filter, and an image sensor and an electronic device each including the spectral filter.

Additional aspects will be set forth in part in the description which follows and, in part, will be apparent from the description, or may be learned by practice of the presented embodiments of the disclosure.

According to an aspect of an embodiment, a spectral filter includes: a first metal reflection layer; a second metal reflection layer arranged above the first metal reflection layer; a plurality of cavities arranged between the first metal reflection layer and the second metal reflection layer and each having a plurality of central wavelengths; and a bandpass filter arranged below the first metal reflection layer or above the second metal reflection layer and including a plurality of band filters transmitting light of different wavelength regions, wherein the plurality of band filters are arranged to correspond to the plurality of cavities, each of the plurality of band filters transmits light of a particular wavelength region, each of the plurality of cavities corresponding to each of the band filters has a plurality of central wavelengths including a central wavelength in the particular wavelength region.

The bandpass filter may include a color filter or a broadband filter.

The plurality of band filters may be provided to correspond one-to-one to the plurality of cavities.

The plurality of band filters may include a first band filter transmitting light of a first wavelength region, a second band filter transmitting light of a second wavelength region, and a third band filter transmitting light of a third wavelength region.

The plurality of cavities may include a first cavity corresponding to the first band filter, a second cavity corresponding to the second band filter, and a third cavity corresponding to the third band filter.

The first cavity may have a plurality of central wavelengths including a central wavelength in the first wavelength region, the second cavity may have a plurality of central wavelengths including a central wavelength in the second wavelength region, and the third cavity may have a plurality of central wavelengths including a central wavelength in the third wavelength region.

The first to third cavities may have different effective refractive indexes.

The first to third cavities may have the same thickness.

Each of the first to third cavities may have a thickness greater than or equal to about 200 nm and less than or equal to about 1000 nm.

At least one of the first to third cavities may include a base and at least one pattern arranged in a certain shape in the base.

The base of each of the first to third cavities may include titanium oxide.

The base of each of the first to third cavities may include silicon nitride or hafnium oxide. Each of the plurality of band filters may be provided to correspond to two or more cavities.

The first and second metal reflection layers may include the same metal material of different metal materials.

The first and second metal reflection layers may include Al, Cu, Ag, Au, Ti, W, or TiN. The first metal reflection layer or the second metal reflection layer may further include poly-Si.

Each of the first and second metal reflection layers may have a thickness of about 10 nm to about 80 nm.

The spectral filter may further include a plurality of dielectric layers arranged above or below the plurality of cavities and having different effective refractive indexes.

According to an aspect of another embodiment, an image sensor includes: a spectral filter; and a pixel array receiving light transmitted through the spectral filter, wherein the spectral filter further includes: a first metal reflection layer; a second metal reflection layer arranged above the first metal reflection layer; a plurality of cavities arranged between the first metal reflection layer and the second metal reflection layer and each having a plurality of central wavelengths; and a bandpass filter arranged below the first metal reflection layer or above the second metal reflection layer and including a plurality of band filters selectively transmitting light of different wavelength regions, wherein the plurality of band filters are arranged to correspond to the plurality of cavities, each of the plurality of band filters transmits light of a particular wavelength region, and each of the plurality of cavities corresponding to each of the band filters has a plurality of central wavelengths including a central wavelength in the particular wavelength region.

The pixel array may include a plurality of pixels, and each pixel may include a wiring layer including a driver circuit and a photodiode arranged at the wiring layer.

The plurality of band filters may include a first band filter transmitting light of a first wavelength region, a second band filter transmitting light of a second wavelength region, and a third band filter transmitting light of a third wavelength region.

The plurality of cavities may include a first cavity corresponding to the first band filter, a second cavity corresponding to the second band filter, and a third cavity corresponding to the third band filter.

The first cavity may have a plurality of central wavelengths including a central wavelength in the first wavelength region, the second cavity may have a plurality of central wavelengths including a central wavelength in the second wavelength region, and the third cavity may have a plurality of central wavelengths including a central wavelength in the third wavelength region.

The first to third cavities may have different effective refractive indexes.

The first to third cavities may have the same thickness.

At least one of the first to third cavities may include a base and at least one pattern arranged in a certain shape in the base.

The spectral filter may further include a plurality of dielectric layers arranged above or below the plurality of cavities and having different effective refractive indexes.

The image sensor may further include a timing controller, a row decoder, and an output circuit.

According to an aspect of another embodiment, an electronic device includes the above-described image sensor.

The electronic device may include a mobile phone, a smartphone, a tablet, a smart tablet, a digital camera, a camcorder, a notebook computer, a television, a smart television, a smart refrigerator, a security camera, a robot, or a medical camera.

According to yet another aspect of an embodiment, a spectral filter includes: a first metal reflection layer; a second metal reflection layer disposed above the first metal reflection layer; a plurality of cavities disposed between the first metal reflection layer and the second metal reflection layer; and a bandpass filter disposed below the first metal reflection layer or above the second metal reflection layer, the bandpass filter including a plurality of band filters transmitting light in a plurality of wavelength regions, wherein the plurality of band filters are disposed to correspond to the plurality of cavities, each of the plurality of band filters transmit light in a corresponding wavelength region, and each of the plurality of cavities corresponding to each of the plurality of band filters, has a corresponding plurality of central wavelengths including a corresponding central wavelength in the corresponding wavelength region.

According to another aspect of another embodiment, a spectral filter includes: a resonator array including: a first metal reflection layer; a second metal reflection layer; and a plurality of multimodal cavities disposed between the first and the second resonator layer, thicknesses of the plurality of multimodal cavities being uniform; and a filter array disposed below or above the resonator array, the filter array including a plurality of filters transmitting light in a plurality of wavelength regions, wherein one filter of the plurality of filters corresponds to one or more of the plurality of multimodal cavities, and the one filter transmits light in one of the plurality of wavelength regions, and wherein one of the plurality of multimodal cavities has a plurality of central wavelengths including a central wavelength in the one of the plurality of wavelength regions of the one filter.

In the spectral filter, one of the plurality of multimodal cavities includes a first dielectric pattern so that the one of the plurality of multimodal cavities has a first effective refractive index, and another of the plurality of multimodal cavities includes a second dielectric pattern so that the other of the plurality of multimodal cavities has a second effective refractive index.

BRIEF DESCRIPTION OF THE DRAWINGS

The above and other aspects, features, and aspects of certain embodiments of the disclosure will be more apparent from the following description taken in conjunction with the accompanying drawings, in which:

FIG. 15 is a plan view of another example of a spectral filter applicable to the image sensor of FIG. 12;

DETAILED DESCRIPTION

Figure 1:
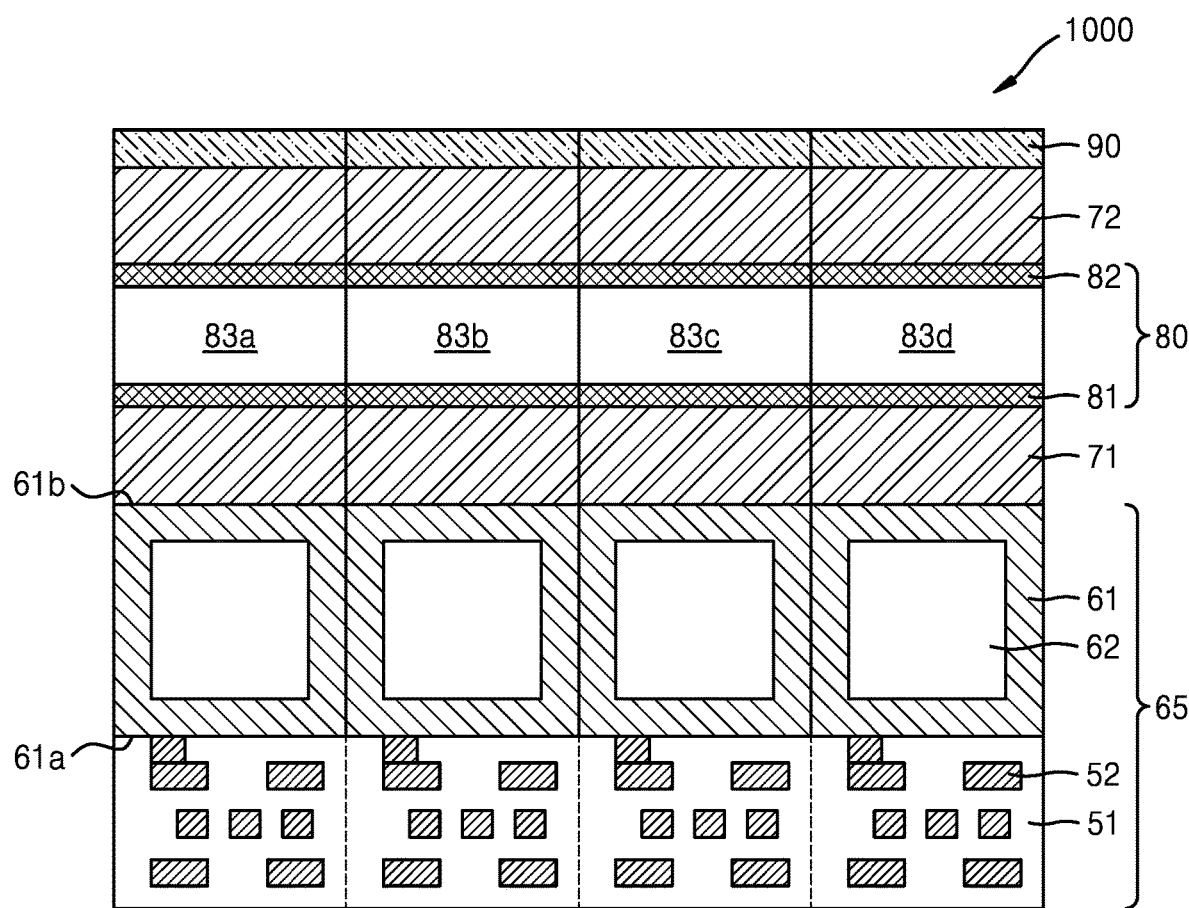
FIG. 1 is a schematic diagram of a cross-section of an image sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or variations thereof.

The use of the terms "a," "an," "the" and similar referents in the context of describing embodiments (especially in the context of the following claims) are to be construed to cover both the singular and the plural. The operations of all methods described herein can be performed in any suitable order unless otherwise indicated herein or otherwise clearly contradicted by context, and embodiments are not limited to the described order of the operations.

Moreover, the terms "part," "module," etc. refer to a unit processing at least one function or operation, and may be implemented by a hardware, a software, or a combination thereof.

The connecting lines or connectors shown in the various figures presented are intended to represent exemplary functional relationships and/or physical or logical couplings between the various elements, and thus it should be noted that many alternative or additional functional relationships, physical connections or logical connections may be present in a practical device.

The use of any and all examples, or exemplary language provided herein, is intended merely to better illuminate technical ideas and does not pose a limitation on the scope of embodiments unless otherwise claimed.

FIG. 1 is a schematic diagram of a cross-section of an image sensor 1000 according to an example embodiment. The image sensor 1000 of FIG. 1 may include, for example, a complementary metal oxide semiconductor (CMOS) image sensor or a charge-coupled device (CCD) image sensor.

With reference to FIG. 1, the image sensor 1000 may include a pixel array 65 and a resonator structure 80 arranged on the pixel array 65. The pixel array 65 may include a plurality of pixels arranged in a two-dimensional (2D) manner, and the resonator structure 80, e.g., a resonator array, may include a plurality of resonators arranged in correspondence with the plurality of pixels.

Each pixel of the pixel array 65 may include a photodiode 62, which is a photoelectric transformation element, and a driver circuit 52 to drive the photodiode 62. The photodiode 62 may be buried in a semiconductor substrate 61. The semiconductor substrate 61 may be, for example, a silicon substrate. However, the disclosure is not limited thereto. A wiring layer 51 may be arranged on a lower surface 61*a* of the semiconductor substrate 61, and the driver circuit 52, such as a metal oxide silicon field effect transistor (MOSFET), etc. may be arranged in the wiring layer 51.

The resonator structure 80 including a plurality of resonators may be arranged above the semiconductor substrate 61. Each resonator may be arranged to transmit light of a particular desired wavelength region. Each resonator may include a first reflection layer 81, a second reflection layer 82, which are spaced apart from each other, and cavities 83*a*, 83*b*, 83*c*, and 83*d* arranged between the first reflection layer 81 and the second reflection layer 82. Each of the first reflection layer 81 and the second reflection layer 82 may include, for example, a metal reflection layer or a Bragg reflection layer. Each of the cavities 83*a*, 83*b*, 83*c*, and 83*d* may be arranged to cause resonance of light of a particular desired wavelength region.

A first functional layer 71 may be arranged between an upper surface 61*b* of the semiconductor substrate 61 and the resonator structure 80. The first functional layer 71 may improve a transmittance of light incident towards the photodiode 62 by passing through the resonator structure 80. To this end, the first functional layer 71 may include a dielectric layer or a dielectric pattern with adjusted refractive index.

A second functional layer 72 may be arranged on an upper surface of the resonator structure 80. The second functional layer 72 may improve a transmittance of light incident towards the resonator structure 80. To this end, the second functional layer 72 may include a dielectric layer or a dielectric pattern with adjusted refractive index. A third functional layer 90 may be further arranged on an upper surface of the second functional layer 72. The third functional layer 90 may include, for example, an anti-reflection layer, a condenser lens, a color filter, a short-wavelength absorption filter, a long-wavelength cut-off filter, etc. However, this is only an example.

At least one of the first to third functional layers 71, 72, and 90 may constitute a spectral filter described below together with the resonator structure 80. Hereinafter, a spectral filter according to an example embodiment is described in detail.

Spectral filters applicable to the image sensor 1000 according to example embodiments are described in detail below. The spectral filters according to example embodiments may detect light having a wavelength range of about 350 nm to about 1000 nm or a wavelength range of about 350 nm to about 1500 nm. However, the disclosure is not limited thereto.

Figure 2:
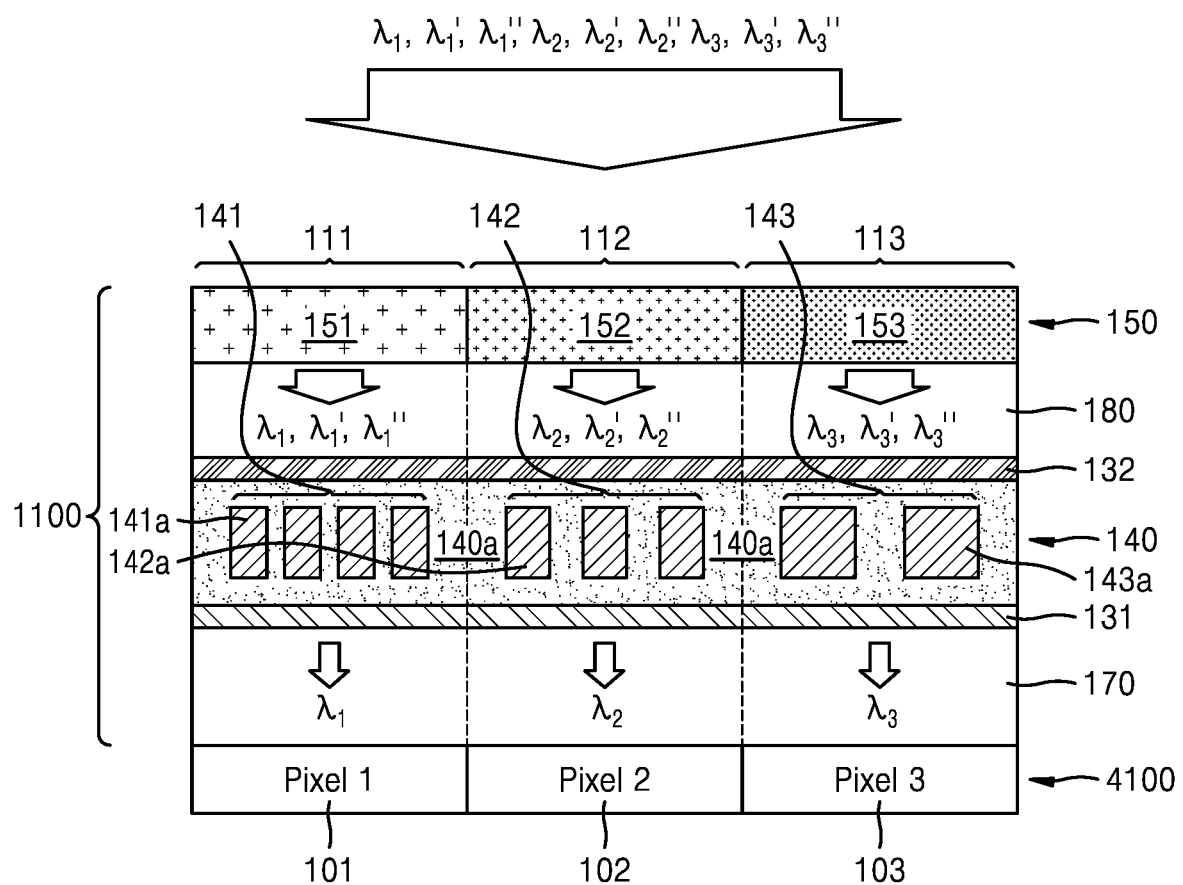
FIG. 2 is a cross-sectional view of a spectral filter according to an example embodiment.

FIG. 2 is a cross-sectional view of a spectral filter 1100 according to an example embodiment. FIG. 2 illustrates an example in which light in the first to third wavelength regions is incident onto the spectral filter 1100. Here, the first wavelength region may include a first wavelength $\lambda_1$, a first wavelength $\lambda_1'$, and a first wavelength $\lambda_1''$, the second wavelength region may include a second wavelength $\lambda_2$, a second wavelength $\lambda_2'$, and a second wavelength $\lambda_2''$, and the third wavelength region may include a third wavelength $\lambda_3$.

With reference to FIG. 2, the spectral filter 1100 may include a plurality of filters (i.e., a first filter 111, a second filter 112, and a third filter 113), e.g., a filter array, arranged in a two-dimensional (2D) manner. A pixel array 4100 including a plurality of pixels (i.e., a first pixel 101, a second pixel 102, and a third pixel 103) respectively corresponding to the first to third filters 111, 112, and 113 may be provided under the spectral filter 1100. FIG. 2 illustrates a case where there are three filters, i.e., the first to third filters 111, 112, and 113 and three pixels, i.e., the first to third pixels 101, 102, and 103.

Although the first to third filters 111, 112, and 113 may be arranged on substantially the same plane, the disclosure is not limited thereto. The first filter 111 may have a central wavelength in the first wavelength region. The first wavelength region may range from, for example, about 350 nm to about 500 nm. However, this is merely exemplary, and the first wavelength region may also have various wavelength ranges according to a design considerations.

The second filter 112 may have a central wavelength in the second wavelength region. The second wavelength region may be longer than the first wavelength region. The second wavelength region may range from, for example, about 500 nm to about 650 nm; however, such range is provided merely as an example. The third filter 113 may have a central wavelength in the third wavelength region. The third wavelength region may be longer than the second wavelength region. The third wavelength region may range from, for example, about 650 nm to about 800 nm; however, such range is provided merely as an example.

The first to third filters 111, 112, and 113 may include a resonator 140 and a bandpass filter 150 arranged above the resonator 140. The resonator 140, e.g., a resonator array, may include a first cavity 141, a second cavity 142, and a third cavity 143, and the bandpass filter 150 may include a first band filter 151, a second band filter 152, and a third band filter 153.

The resonator 140 may have a Fabry-Perot structure. Specifically, the resonator 140 may include a first metal reflection layer 131, a second metal reflection layer 132 spaced apart from each other, and the first to third cavities 141, 142, and 143 disposed between the first metal reflection layer 131 and the second metal reflection layer 132. Each of the first to third cavities 141, 142, and 143 may have a multi-mode cavity structure having a plurality of central wavelengths as described below.

When light passes through the second metal reflection layer 132 and is incident on each of the first to third cavities 141, 142, and 143, the light may internally reflect in the first to third cavities 141, 142, and 143 between the first metal reflection layer 131 and the second metal reflection layer 132 during which a constructive interference and a destructive interference occur. In each of the first to third cavities 141, 142, and 143, the light having particular central wavelengths and satisfying constructive interference conditions may output through the first metal reflection layer 131 and is incident onto each of the first to third pixels 101, 102, and 103 of the pixel array 4100.

A lower dielectric layer 170 may be further provided between the resonator 140 and the pixel array 4100, and an upper dielectric layer 180 may be further provided between the resonator 140 and the bandpass filter 150. The lower and upper dielectric layers 170 and 180 may include a transparent dielectric material increasing a transmittance of a central wavelength. The lower and upper dielectric layers 170 and 180 may include, for example, titanium oxide, silicon nitride, hafnium oxide, silicon oxide, high index polymer, etc.; however, the disclosure is not limited thereto.

The first filter 111 may further include the first cavity 141 disposed between the first metal reflection layer 131 and the second metal reflection layer 132 and the first band filter 151 disposed above the first cavity 141. The second filter 112 may further include the second cavity 142 disposed between the first metal reflection layer 131 and the second metal reflection layer 132 and the second band filter 152 disposed above the second cavity 142. The third filter 113 may further include the third cavity 143 disposed between the first metal reflection layer 131 and the second metal reflection layer 132 and the third band filter 153 disposed above the third cavity 143.

Figure 3A:
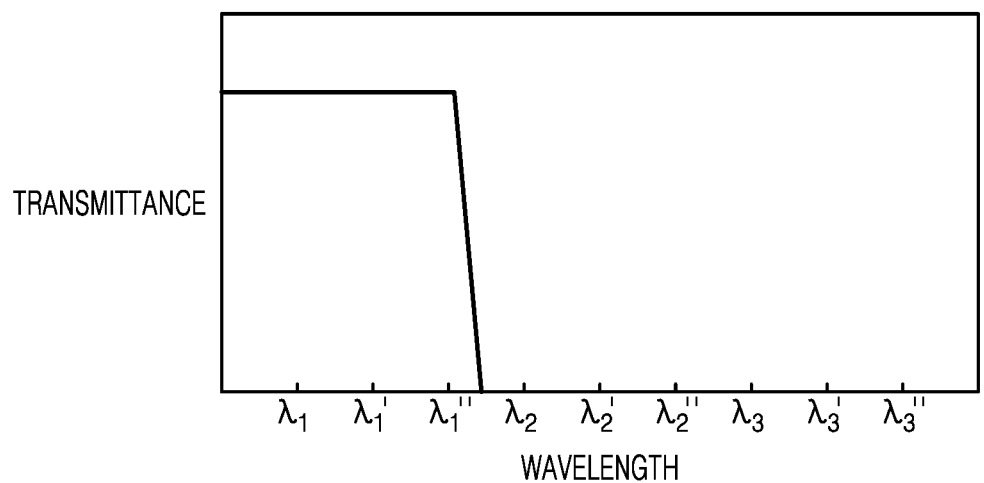
FIGS. 3A to 3C are diagrams of examples of transmission spectrums of a first bandpass filter, a second bandpass filter, and a third bandpass filter in the spectral filter of FIG. 2.
Figure 3B:
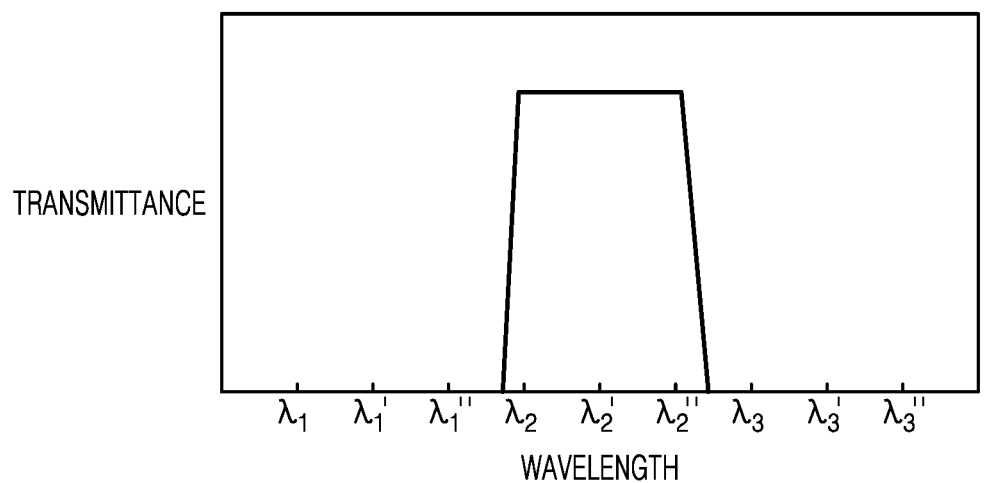
Figure 3C:
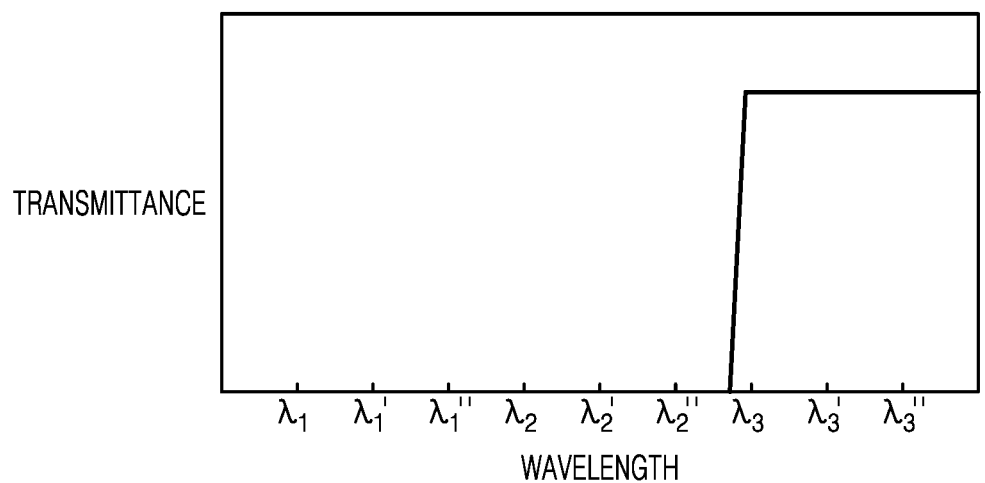

Each of the first to third band filters 151, 152, and 153 may transmit light of a particular wavelength region and block light of other wavelength regions. FIGS. 3A to 3C illustrate examples of transmission spectrums of the first to third band filters 151, 152, and 153. FIG. 3A illustrates transmission spectrums of the first band filter 151, and the first band filter 151 may transmit light of the first wavelength region. FIG. 3B illustrates transmission spectrums of the second band filter 152, and the second band filter 152 may transmit light of the second wavelength region. FIG. 3C illustrates transmission spectrums of the third band filter 153, and the third band filter 153 may transmit light of the third wavelength region.

In the spectral filter 1100 of FIG. 2, when light of the first wavelength region, light of the second wavelength region, and light of the third wavelength region are incident onto the bandpass filter 150, light of the first wavelength $\lambda_1$, light of a first wavelength $\lambda 1'$, light of the first wavelength $\lambda 1''$ in the first wavelength region may pass through the first band filter 151. Light of a second wavelength $\lambda_2$, light of a second wavelength $\lambda_2'$, and light of a second wavelength $\lambda_2''$ in the second wavelength region may pass through the second band filter 152, and light of a third wavelength $\lambda_3$, light of a third wavelength $\lambda_3'$, and light of a third wavelength $\lambda_3''$ in the third wavelength region may pass through the third band filter 153.

For example, a color filter may be used as the bandpass filter 150. For example, the color filter may be typical color filters applied to color display devices such as liquid crystal display devices, organic light-emitting display devices, etc. In this case, the first band filter 151 may be a blue color filter, the second band filter 152 may be a green color filter, and the third band filter 153 may be a red color filter.

In addition to the aforementioned color filter, a broad-bandpass filter may also be used as the bandpass filter 150. In this case, the first band filter 151, the second band filter 152, and the third band filter 153 may respectively be a first broadband filter, a second broadband filter, and a third broadband filter. Each of the first to third broadband filters may have, for example, a multi-cavity structure, or a metal mirror structure.

Figure 4:
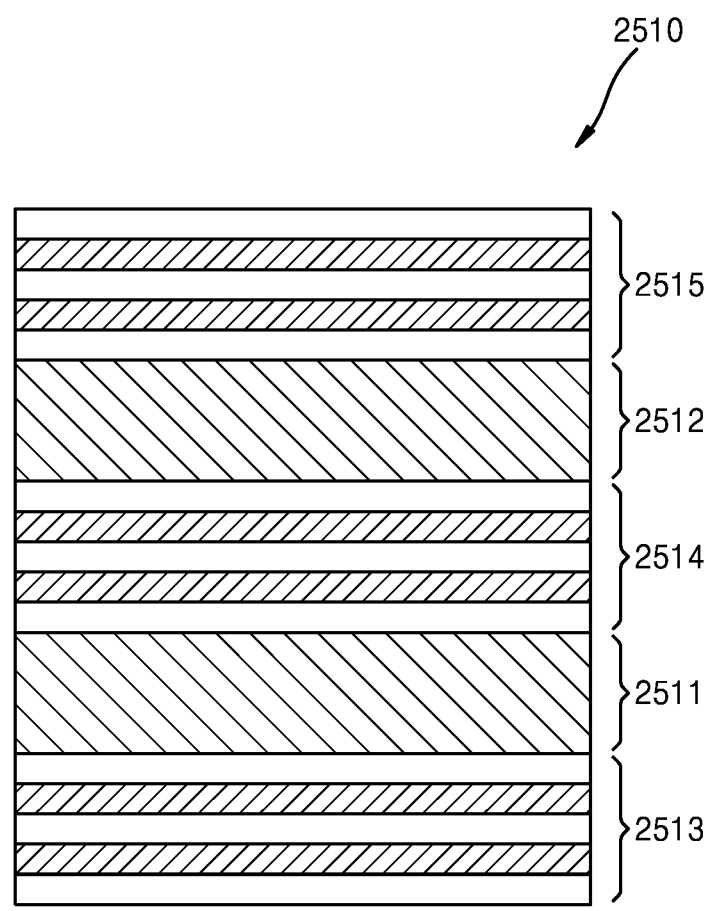
FIG. 4 is a diagram of an example of the bandpass filter of FIG. 2.

FIG. 4 is a diagram of an example of a broadband filter. With reference to FIG. 4, a broadband filter 2510 may include a plurality of reflection layers (i.e., a first reflection layer 2513, a second reflection layer 2514, and a third reflection layer 2515) spaced apart from each other and a plurality of cavities (i.e., a first cavity 2511 and a second cavity 2512) disposed between the first to third reflection layers 2513, 2514, and 2515. FIG. 4 illustrates three reflection layers (i.e., the first to third reflection layers 2513, 2514, and 2515) and two cavities (i.e., the first and second cavities 2511 and 2512); however, the number of the reflection layers and the cavities may vary.

The first to third reflection layers 2513, 2514, and 2515 may be spaced apart from each other, the first cavity 2511 may be disposed between the first reflection layer 2513 and the second reflection layer 2514, and the second cavity 2512 may be disposed between the third reflection layer 2514 and the fourth reflection layer 2515.

Each of the first and second cavities 2511 and 2512 may include a material having a certain refractive index. Each of the first and second cavities 2511 and 2512 may include two or more materials having different refractive indexes.

Each of the first to third reflection layers 2513, 2514, and 2515 may be a Bragg reflection layer. The Bragg reflection layer may be a distributed Bragg reflector (DBR). Each of the first to third reflection layers 2513, 2514, and 2515 may have, for example, a structure in which a plurality material layers having different refractive indexes are alternately stacked.

Figure 5:
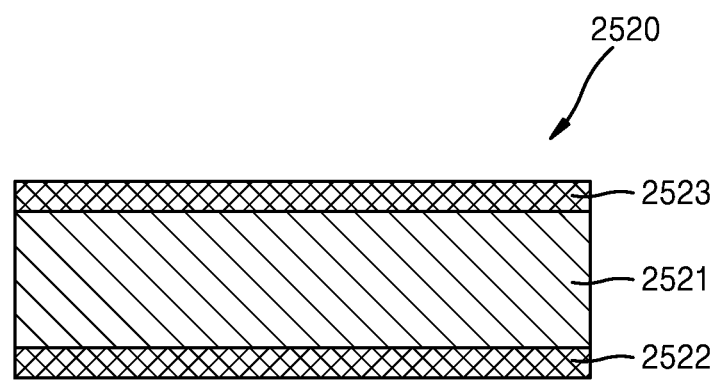
FIG. 5 is a diagram of another example of the bandpass filter of FIG. 2.

FIG. 5 is a diagram of another example of a broadband filter. With reference to FIG. 5, the broadband filter 2520 may include a first metal mirror layer 2522, a second metal mirror layer 2523 spaced apart from each other, and a cavity 2521 disposed between the first metal mirror layer 2522 and the second metal mirror layer 2523.

Referring back to FIG. 2, the first to third cavities 141, 142, and 143 may be disposed between the first metal reflection layer 131 and the second metal reflection layer 132. The first and second metal reflection layers 131 and 132 may include a metal material capable of reflecting light of a certain wavelength region. The first and second metal reflection layers 131 and 132 may include, for example, Al, Cu, Ag, Au, Ti, W, TiN, etc.; however, the disclosure is not limited thereto. The first and second metal reflection layers 131 and 132 may further include poly-Si.

The first and second metal reflection layers 131 and 132 may include the same metal material. For example, the first and second metal reflection layers 131 and 132 may include Al. Alternatively, the first and second metal reflection layers 131 and 132 may include Cu. The first and second metal reflection layers 131 and 132 may include different metal materials. For example, the first metal reflection layer 131 may include Cu, and the second metal reflection layer 132 may include Au. However, this is only an example.

The first and second metal reflection layers 131 and 132 may have a thickness of tens of nanometers; however, the present disclosure is not limited thereto. For example, each of the first and second metal reflection layers 131 and 132 may have a thickness of about 10 nm to about 80 nm.

Each of the first to third cavities 141, 142, and 143 may have a multi-mode cavity structure having a plurality of central wavelengths. As such, for it to be a multi-modal cavity structure, each of the first to third cavities 141, 142, and 143 may be formed to have a thickness greater than or equal a certain thickness. The first to third cavities 141, 142, and 143 may have the same thickness. The first to third cavities 141, 142, and 143 may have different effective refractive indexes so that they have different central wavelengths.

The first to third cavities 141, 142, and 143 may include, for example, silicon, silicon oxide, silicon nitride, hafnium oxide, or titanium oxide; however, this is merely an example, and the first to third cavities 141, 142, and 143 may include other various dielectric materials.

The first cavity 141 may include a base 140a. Furthermore, the first cavity 141 may include at least one first pattern 141a disposed in the base 140a in a certain shape and including a dielectric material different from a material of the base 140a. An effective refractive index of the first cavity 141 may be determined according to the material of the base 140a, the material of the first pattern 141a, a content of the material of the first pattern 141a, etc.

For example, the base 140a of the first cavity 141 may include titanium oxide. The base 140a of the first cavity 141 may include silicon nitride of hafnium oxide. However, this is only an example.

Specifically, in the first cavity 141, the base 140a may include titanium oxide, and the first pattern 141a may include silicon oxide. However, this is merely an example. The base 140a may include silicon oxide, and the first pattern 141a may include titanium oxide.

The first cavity 141 may have a thickness greater than or equal to a certain thickness for it to be multi-modal. For example, the first cavity 141 may have a thickness greater than or equal to about 200 nm and less than or equal to about 1000 nm. For example, the first cavity 141 may have a thickness greater than or equal to about 250 nm and less than or equal to about 700 nm. However, the disclosure is not limited thereto.

The second cavity 142 may include the base 140a and at least one second pattern 142a disposed in the base 140a in a certain shape. The second cavity 142 may have an effective refractive index different than that of the first cavity 141 so that the second cavity 142 has central wavelengths different than those of the first cavity 141. The effective refractive index of the second cavity 142 may be determined according to the material of the base 140a, the material of the second pattern 142a, a content of the material of the second pattern 142a, etc. The second pattern 142a may include the same material as the first pattern 141a. In this case, a content of the material of the second pattern 142a may be different from that of the material of the first pattern 141a. The second pattern 142a may include a material different than that of the first pattern 141a. Similar to the first cavity 141, the second cavity 142 may have a thickness greater than or equal to a certain thickness for it to be multi-modal.

The third cavity 143 may include the base 140a and at least one third pattern 143a disposed in the base 140a in a certain shape. The third cavity 143 may have an effective refractive index different than those of the first and second cavities 141 and 142 so that the third cavity 143 has central wavelengths different than those of the first and second cavities 141 and 142. The effective refractive index of the third cavity 143 may be determined according to the material of the base 140a, the material of the third pattern 143a, a content of the material of the third pattern 143a, etc. The third pattern 143a may include the same material as the first and second patterns 141a and 142a. In this case, a content of the material of the third pattern 143a may be different from those of the materials of the first and second patterns 141a and 142a. The third pattern 143a may include a material different from those of the first and second patterns 141a and 142a.

Similar to the first and second cavities 141 and 142, the third cavity 143 may have a thickness greater than or equal to a certain thickness for it to be multi-modal. The first to third cavities 141, 142, and 143 may have the same thickness. For example, the first to third cavities 141, 142, and 143 may have a thickness greater than or equal to about 200 nm and less than or equal to about 1000 nm (e.g., about greater than or equal to 250 nm and less than or equal to 700 nm).

Figure 6A:
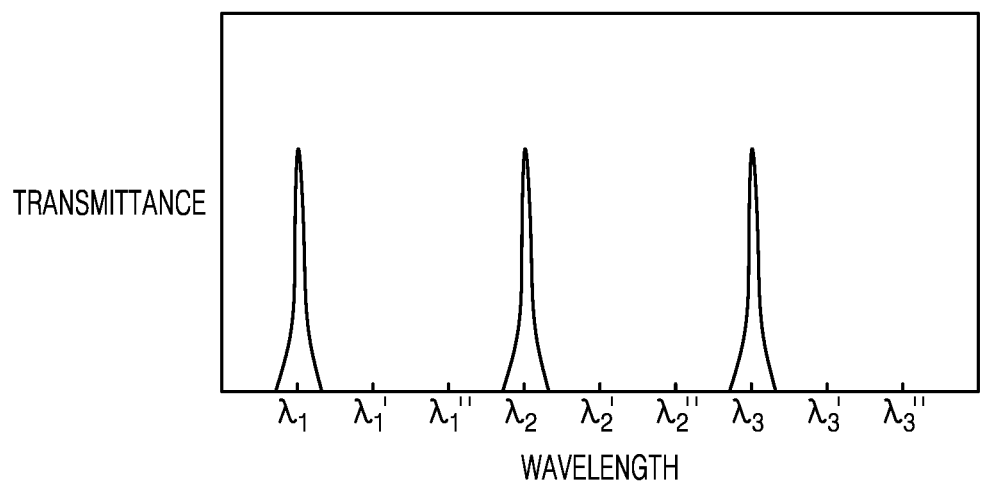
FIGS. 6A to 6C are diagrams of examples of transmission spectrums of a first cavity, a second cavity, and a third cavity in the spectral filter of FIG. 2.
Figure 6B:
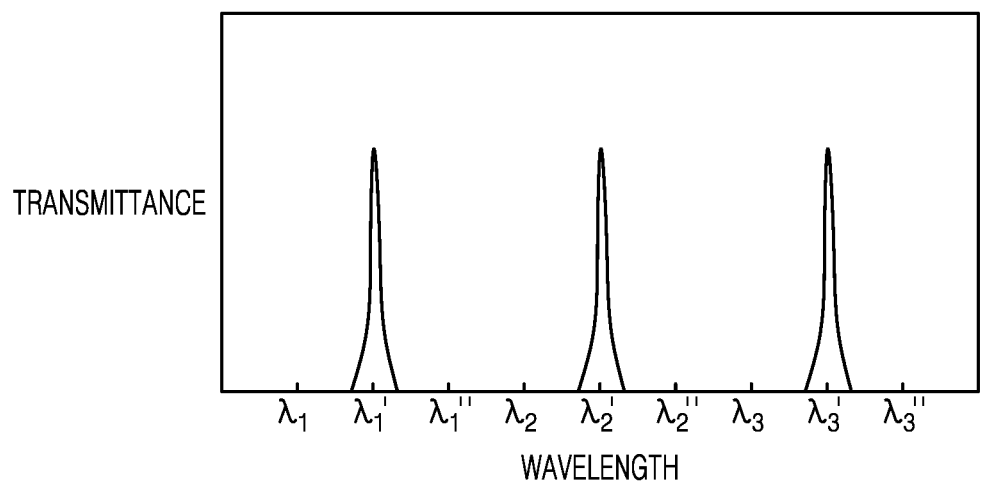
Figure 6C:
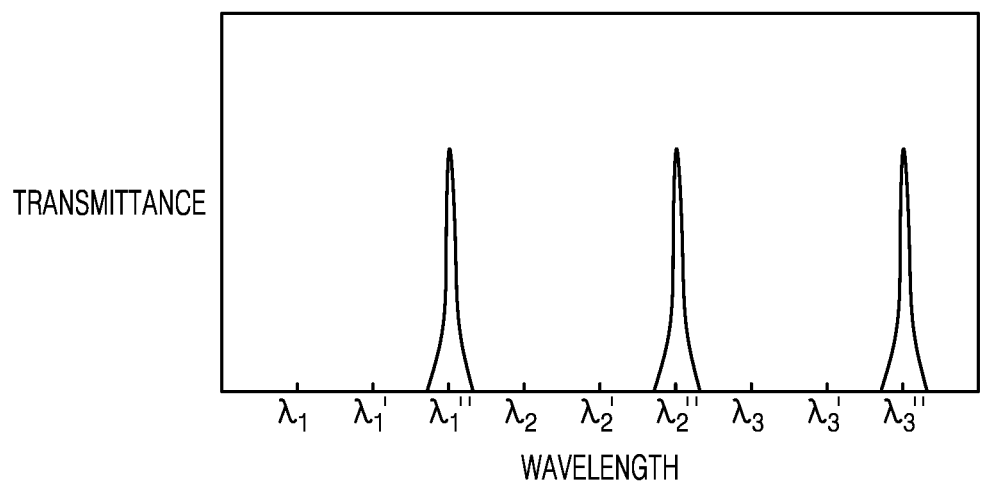

FIGS. 6A to 6C illustrate examples of transmission spectrums of the first to third cavities 141, 142, and 143. FIGS. 6A to 6C illustrate a case where each of the first to third cavities 141, 142, and 143 has three central wavelengths. However, the present disclosure is not limited thereto, and each of the first to third cavities 141, 142, and 143 may have two or more than four central wavelengths based on their thicknesses and effective refractive indexes.

FIG. 6A illustrates transmission spectrums of the first cavity 141, and the first cavity 141 may have a first wavelength $\lambda_1$, a second wavelength $\lambda_2$, and a third wavelength $\lambda_3$ as central wavelengths. Here, each of the first wavelength $\lambda_1$, the second wavelength $\lambda_2$, and the third wavelength $\lambda_3$ may be in the first wavelength region, the second wavelength region, and the third wavelength region, respectively.

FIG. 6B illustrates transmission spectrums of the second cavity 142, and the second cavity 142 may have a first wavelength $\lambda_1'$, a second wavelength $\lambda_2'$, and a third wavelength $\lambda_3'$ as central wavelengths. Each of the first wavelength $\lambda_1'$, the second wavelength $\lambda_2'$, and the third wavelength $\lambda_3'$ may be spaced apart from the first wavelength $\lambda_1$, the second wavelength $\lambda_2$, and the third wavelength $\lambda_3$ at a certain distance respectively; however, the present disclosure is not limited thereto. Each of the first wavelength $\lambda_1'$, the second wavelength $\lambda_2'$, and the third wavelength $\lambda_3'$ may be in the first wavelength region, the second wavelength region, and the third wavelength region, respectively.

FIG. 6C illustrates transmission spectrums of the third cavity 143, and the third cavity 143 may have a first wavelength $\lambda_1''$, a second wavelength $\lambda_2''$, and a third wavelength $\lambda_3''$ as central wavelengths. Each of the first wavelength $\lambda_1''$, the second wavelength $\lambda_2''$, and the third wavelength $\lambda_3''$ may be spaced apart from the first wavelength $\lambda_1'$, the second wavelength $\lambda_2'$, and the third wavelength $\lambda_3'$ at a certain distance respectively; however, the present disclosure is not limited thereto. Each of the first wavelength $\lambda_1''$, the second wavelength $\lambda_2''$, and the third wavelength $\lambda_3''$ may be in the first wavelength region, the second wavelength region, and the third wavelength region, respectively.

As illustrated in FIGS. 6A to 6C, each of the first to third cavities 141, 142, and 143 may implement the multi-mode having a plurality of central wavelengths, and as the first to third cavities 141, 142, and 143 have different effective refractive indexes, the first to third cavities 141, 142, and 143 may have different central wavelengths.

As described above, in the spectral filter 1100 of FIG. 2, when light of the first wavelength region, light of the second wavelength region, and light of the third wavelength region are incident onto the bandpass filter 150, light of the first wavelength $\lambda_1$, light of the first wavelength $\lambda_1'$, and light of the first wavelength $\lambda_1''$ in the first wavelength region may pass through the first band filter 151. Light of the second wavelength $\lambda_2$, light of the second wavelength $\lambda_2'$, and light of the second wavelength $\lambda_2''$ in the second wavelength region may pass through the second band filter 152, and light of the third wavelength $\lambda_3$, light of the third wavelength $\lambda_3'$, and light of the third wavelength $\lambda_3''$ in the third wavelength region may pass through the third band filter 153.

When the light of the first wavelength $\lambda_1$, light of the first wavelength $\lambda_1'$, and light of the first wavelength $\lambda_1''$ which have passed through the first band filter 151 are incident into the first cavity 141, only the light of the first wavelength $\lambda_1$ may pass through the first cavity 141 and be incident onto the first pixel 101. When the light of the second wavelength $\lambda_2$, light of the second wavelength $\lambda_2'$, and light of the second wavelength $\lambda_2''$ which have passed through the second band filter 152 are incident into the second cavity 142, only the light of the second wavelength $\lambda_2$ may output through the second cavity 142 and be incident onto the second pixel 102. When the light of the third wavelength $\lambda_3$, light of the third wavelength $\lambda_3'$, and light of the third wavelength $\lambda_3''$ which have passed through the third band filter 153 are incident into the third cavity 143, only the light of the third wavelength $\lambda_3$ may output through the third cavity 143 and be incident onto the third pixel 103. Accordingly, each of the first to third pixels 101, 102, and 103 may detect light of the first wavelength $\lambda_1$, light of the second wavelength $\lambda_2$, and light of the third wavelength $\lambda_3$.

According to the embodiment, by combining the bandpass filter 150 transmitting light of a particular wavelength region with each of the first to third cavities 141, 142, and 143 of the multi-mode structure having a plurality of central wavelengths, the spectral filter 1100 capable of detecting light of a desired wavelength may be implemented. Moreover, by forming the first to third cavities 141, 142, and 143 having the multi-mode structure in the same thickness, the spectral filter 1100 may be manufactured by a simpler process.

Figure 7:
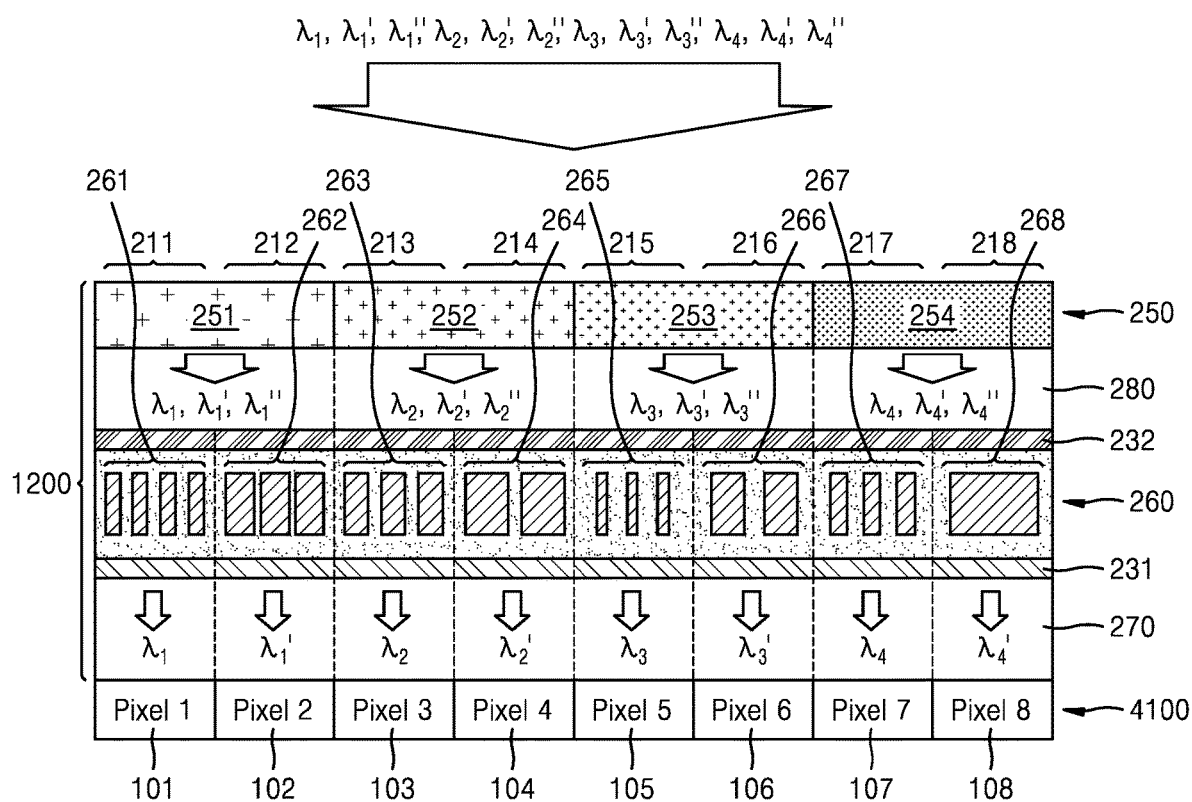
FIG. 7 is a diagram of a spectral filter according to another example embodiment.

FIG. 7 is a diagram of a spectral filter 1200 according to another example embodiment. FIG. 7 illustrates an example in which light in the first to fourth wavelength regions is incident onto the spectral filter 1200. Here, the first wavelength region may include a first wavelength $\lambda_1$, a first wavelength $\lambda_1'$, and a first wavelength $\lambda_1''$, the second wavelength region may include a second wavelength $\lambda_2$, a second wavelength $\lambda_2'$, and a second wavelength $\lambda_2''$, the third wavelength region may include a third wavelength $\lambda_3$, a third wavelength $\lambda_3'$, and a third wavelength $\lambda_3''$, and the fourth wavelength region may include a fourth wavelength $\lambda_4$, a fourth wavelength $\lambda_4'$, and a fourth wavelength $\lambda_4''$. Hereinafter, embodiments will be described focusing on the differences from the above-described embodiments.

With reference to FIG. 7, the spectral filter 1200 may include a plurality of filters (i.e., a first filter 211, a second filter 212, a third filter 213, a fourth filter 214, a fifth filter 215, a sixth filter 216, a seventh filter 217, an eighth filter 218), and the pixel array 4100 including a plurality of pixels (i.e., the first pixel 101, the second pixel 102, the third pixel 103, a fourth pixel 104, a fifth pixel 105, a sixth pixel 106, a seventh pixel 107, and an eighth pixel 108) may be disposed under the spectral filter 1200. FIG. 7 illustrates eight filters (i.e., the first to eight filters 211 to 218) and eight pixels (i.e., the first to eighth pixels 101 to 108).

The first and second filters 211 and 212 may have a central wavelength in the first wavelength region. The first wavelength region may range from, for example, about 350 nm to about 500 nm. The third and fourth filters 213 and 214 may have a central wavelength in the second wavelength region. The second wavelength region may range from, for example, about 500 nm to about 650 nm.

The fifth and sixth filters 215 and 216 may have a central wavelength in the third wavelength region. The third wavelength region may range from, for example, about 650 nm to about 800 nm. The seventh and eighth filters 217 and 218 may have a central wavelength in the fourth wavelength region. The fourth wavelength region may range from, for example, about 800 nm to about 1000 nm or about 800 nm to about 1500 nm.

The first to eighth filters 211 to 218 may include a resonator 260 and a bandpass filter 250 disposed above the resonator 260. The resonator 260 may include a first cavity 261, a second cavity 262, a third cavity 263, a fourth cavity 264, a fifth cavity 265, a sixth cavity 266, a seventh cavity 267, and an eighth cavity 268 disposed between a first metal reflection layer 231 and a second metal reflection layer 232. The bandpass filter 250 may include a first band filter 251, a second band filter 252, a third band filter 253, and a fourth band filter 254. A lower dielectric layer 270 may be further provided between the resonator 260 and the pixel array 4100, and an upper dielectric layer 280 may be further provided between the resonator 260 and the bandpass filter 250.

Each of the first to eighth cavities 261 to 268 may have the multi-mode structure having a plurality of central wavelengths as described above. To this end, each of the first to eighth cavities 261 to 268 may have a thickness greater than or equal to a certain thickness. Moreover, the first to eighth cavities 261 to 268 may have different effective refractive indexes so that they have different central wavelengths.

As described above, a color filter of a broadband filter may be used as the bandpass filter 250. Each of the first to fourth band filters 251 to 254 may transmit light of a particular wavelength region and block light of other wavelength regions.

The first band filter 251 may transmit light of the first wavelength region (e.g., about 350 nm to about 500 nm). The first band filter 251 may correspond to the first and second cavities 261 and 262. The first band filter 251 may be disposed above the first and second cavities 261 and 262. The second band filter 252 may transmit light of the second wavelength region (e.g., about 500 nm to about 650 nm). The second band filter 252 may correspond to the third and fourth cavities 263 and 264. The second band filter 252 may be disposed above the third and fourth cavities 263 and 264.

The third band filter 253 may transmit light of the third wavelength region (e.g., about 650 nm to about 800 nm). The third band filter 253 may correspond to the fifth and sixth cavities 265 and 266. The third band filter 253 may be disposed above the fifth and sixth cavities 265 and 266.

The fourth band filter 254 may transmit light of the fourth wavelength region (e.g., about 800 nm to about 1000 nm). The fourth band filter 254 may correspond to the seventh and eighth cavities 267 and 268. The fourth band filter 254 may be disposed above the seventh and eighth cavities 267 and 268.

For example, as the first band filter 251, the second band filter 252, and the third band filter 253, a blue color filter, a green color filter, and a red color filter may be used, respectively, and as the fourth band filter 254, a near-field ray (NIR) filter may be used. When the fourth wavelength region has a range of NIR wavelength, a blue color filter may be used as the fourth band filter 254.

In the spectral filter 1200 of FIG. 7, when light of the first wavelength region, light of the second wavelength region, light of the third wavelength region, and light of the fourth wavelength region are incident onto the bandpass filter 250, light of the first wavelength $\lambda_1$, light of the first wavelength $\lambda_1'$, and light of the first wavelength $\lambda_1''$ in the first wavelength region may pass through the first band filter 251 and be incident onto the first and second cavities 261 and 262. Here, the light of the first wavelength $\lambda_1$ may output through the first cavity 261 to be incident onto the first pixel 101, and the light of the first wavelength $\lambda_1'$ may output through the second cavity 262 to be incident onto the second pixel 102.

The light of the second wavelength $\lambda_2$, light of the second wavelength $\lambda_2'$, and light of the second' wavelength $\lambda_2''$ in the second wavelength region may pass through the second band filter 252 and be incident onto the third and fourth cavities 263 and 264. Here, the light of the second wavelength $\lambda_2$ may output through the third cavity 263 to be incident onto the third pixel 103, and the light of the second wavelength $\lambda_2'$ may output through the fourth cavity 264 to be incident onto the fourth pixel 104.

The light of the third wavelength $\lambda_3$, light of the third wavelength $\lambda_3'$, and light of the third wavelength $\lambda_3''$ in the third wavelength region may pass through the third band filter 253 and be incident onto the fifth and sixth cavities 265 and 266. Here, the light of the third wavelength $\lambda_3$ may output through the fifth cavity 265 to be incident onto the fifth pixel 105, and the light of the third wavelength $\lambda_3'$ may output through the sixth cavity 266 to be incident onto the sixth pixel 106.

The light of the fourth wavelength $\lambda_4$, light of the fourth wavelength $\lambda_4'$, and light of the fourth wavelength $\lambda_4''$ in the fourth wavelength region may pass through the fourth band filter 254 and be incident onto the seventh and eighth cavities 267 and 268. Here, the light of the fourth wavelength $\lambda_4$ may output through the seventh cavity 267 to be incident onto the seventh pixel 107, and the light of the fourth wavelength $\lambda_4'$ may output through the eighth cavity 268 to be incident onto the eighth pixel 108.

Hereinafter, simulation results concerning the spectral filter 1200 of FIG. 7 are described. A Cu layer having a thickness of 30 nm and an Al layer having a thickness of 10 nm are used as the first and second metal reflection layers 231 and 232, respectively. The first to eighth cavities 261 to 268 have a thickness of 400 nm.

Figure 8A:
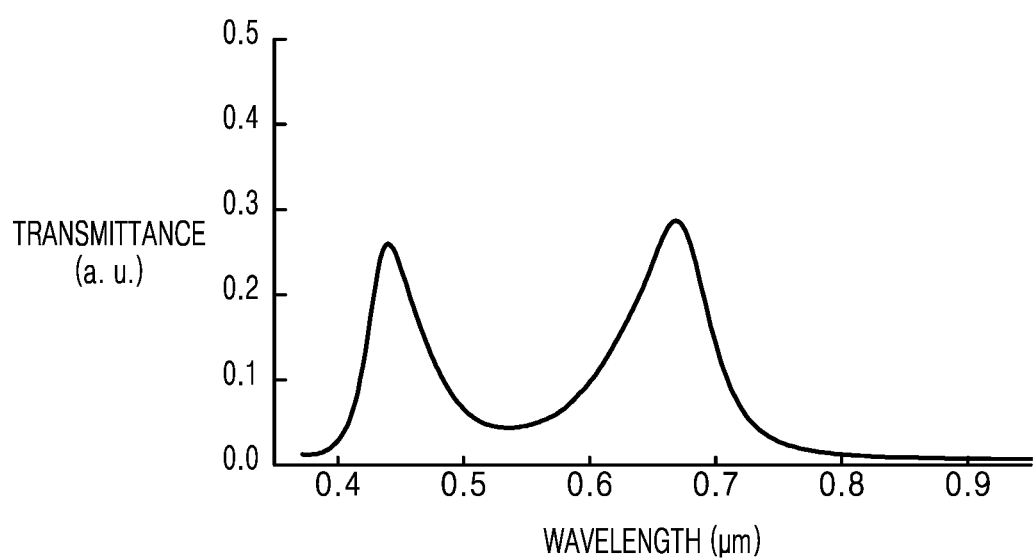
FIGS. 8A and 8B show simulation results of transmission spectrums of a first cavity and a second cavity in the spectral filter of FIG. 7.
Figure 8B:
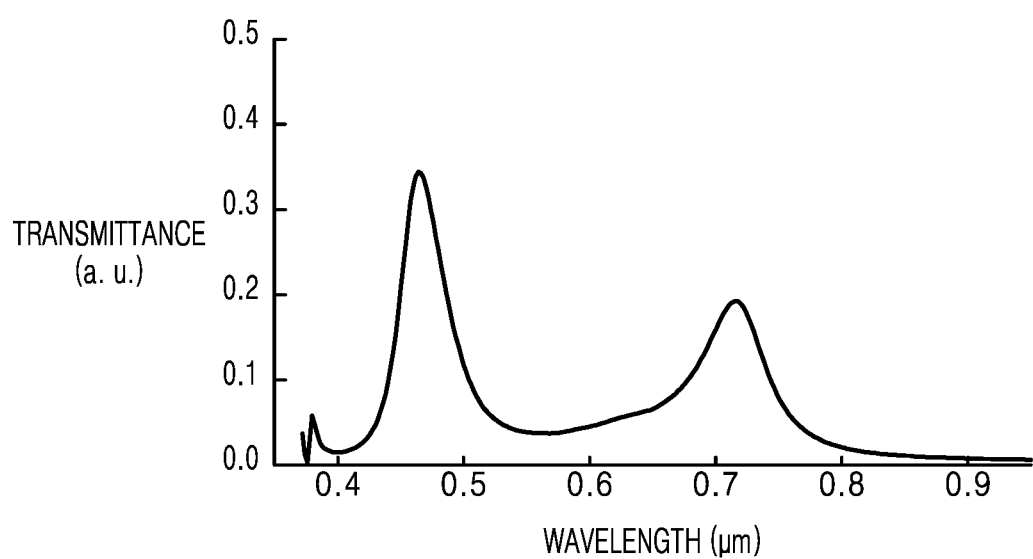

FIGS. 8A and 8B show simulation results of transmission spectrums of the first cavity 261 and the second cavity 262 in the spectral filter 1200 of FIG. 7. Here, the first cavity 261 only includes titanium oxide, whereas the base of the second cavity 262 includes titanium oxide and the pattern of the second cavity 262 includes silicon oxide. The content of the pattern in the second cavity 262 is 20%.

With reference to FIGS. 8A and 8B, each of the first and second cavities 261 and 262 has two central wavelengths (i.e., the first cavity 261 has two central wavelengths, a wavelength of blue light region and a wavelength of red light region, and the second cavity 262 has two central wavelengths, another wavelength of the blue light region and another wavelength of the red light region.) Furthermore, the central wavelengths of the second cavity 262 are shifted away from the central wavelengths of the first cavity 261 by a certain distance.

Figure 9A:
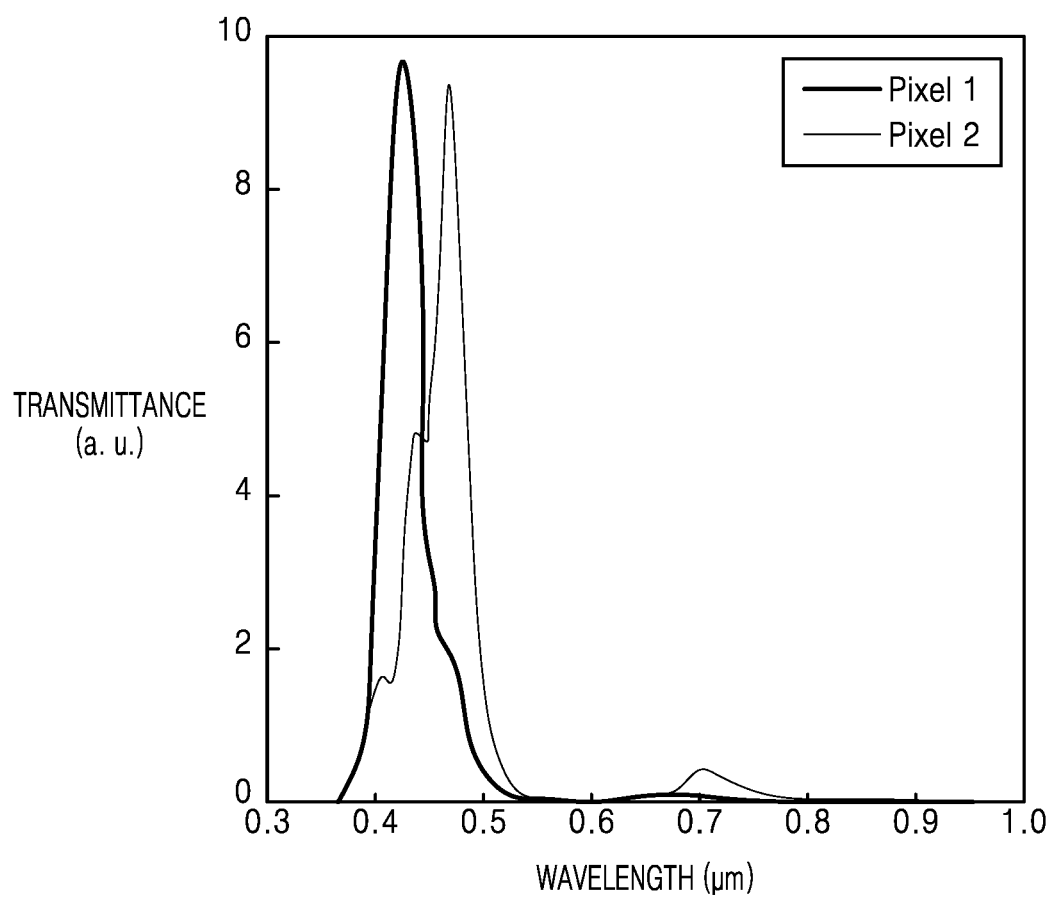
FIG. 9A shows simulation results of absorption spectrums detected in a first pixel and a second pixel through the spectral filter of FIG. 7.

FIG. 9A shows simulation results of absorption spectrums detected in the first pixel 101 and the second pixel 102 through the spectral filter 1200 of FIG. 7. Here, a blue color filter is used as the first band filter 251. With reference to FIG. 9A, wavelengths of blue light region are detected in the first and second pixels 101 and 102.

Figure 9B:
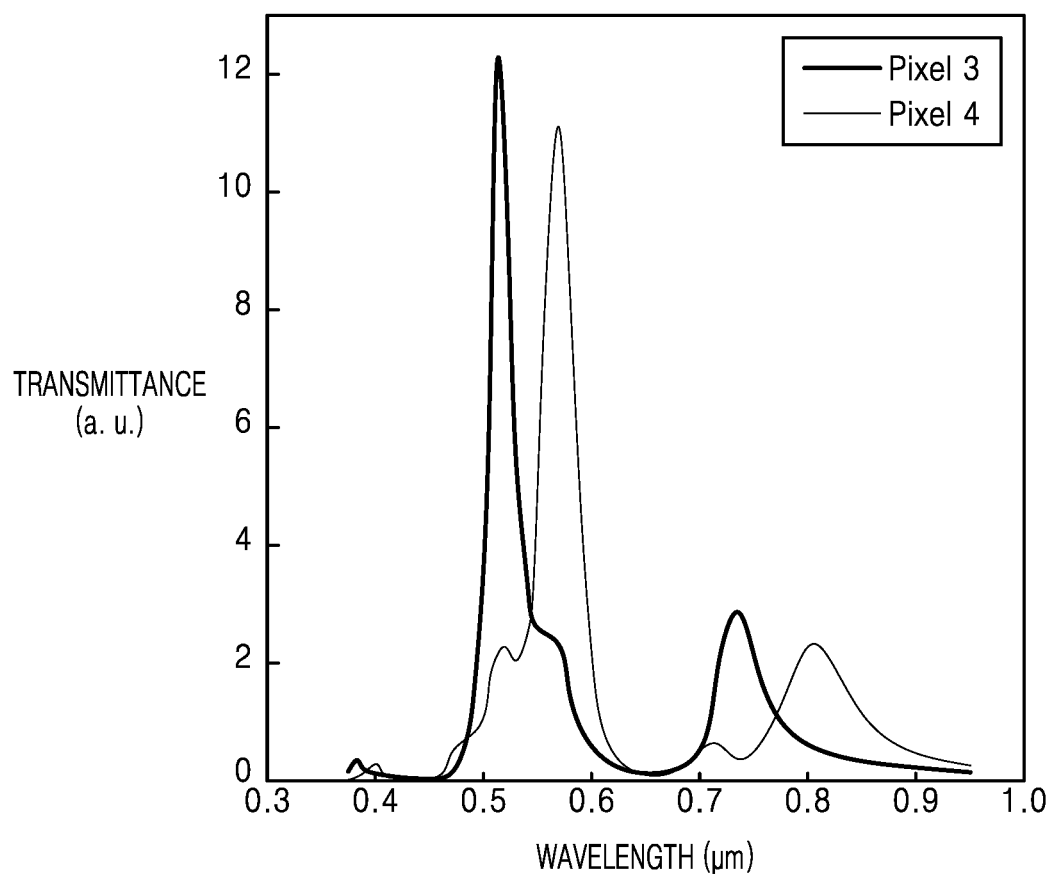
FIG. 9B shows simulation results of absorption spectrums detected in a third pixel and a fourth pixel through the spectral filter of FIG. 7.

FIG. 9B shows simulation results of absorption spectrums detected in the third pixel 103 and the fourth pixel 104 through the spectral filter 1200 of FIG. 7. Here, a green color filter is used as the second band filter 252. With reference to FIG. 9B, wavelengths of green light region are detected in the third and fourth pixels 103 and 104.

Figure 9C:
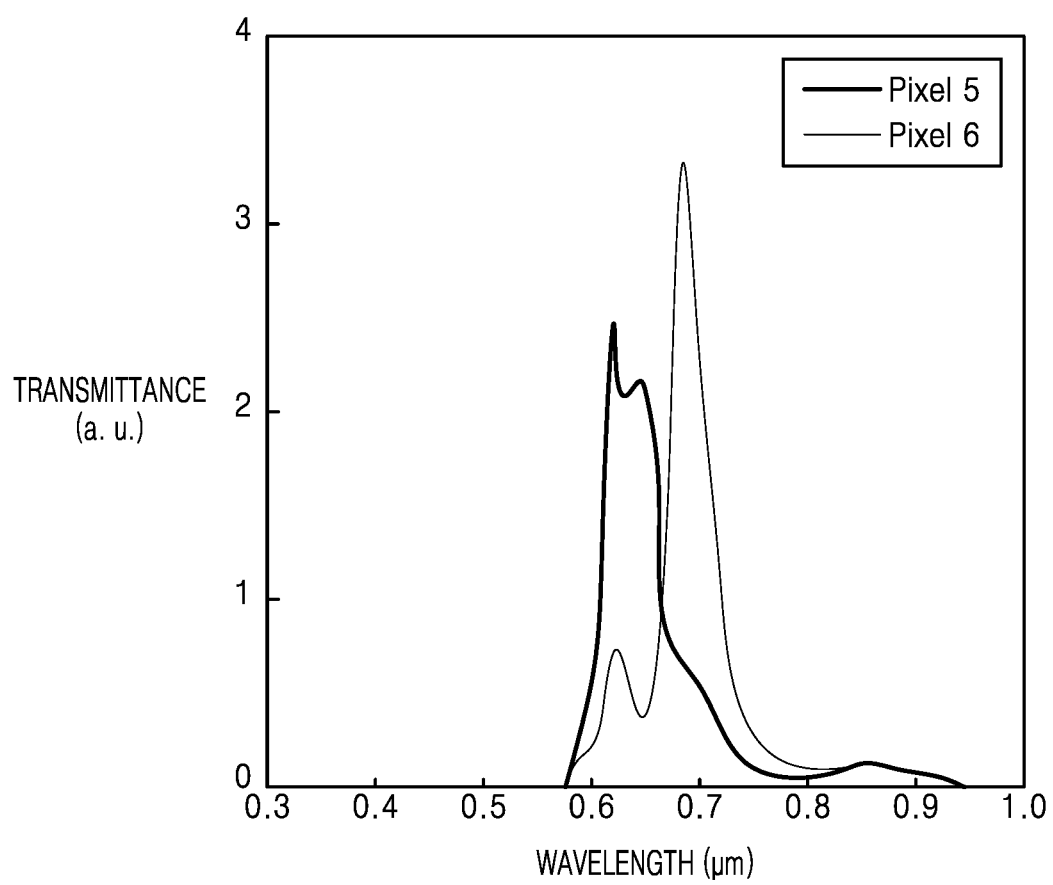
FIG. 9C shows simulation results of absorption spectrums detected in a fifth pixel and a sixth pixel through the spectral filter of FIG. 7.

FIG. 9C shows simulation results of absorption spectrums detected in the fifth pixel 105 and the sixth pixel 106 through the spectral filter 1200 of FIG. 7. Here, a red color filter is used as the third band filter 253. With reference to FIG. 9C, wavelengths of red light region are detected in the fifth and sixth pixels 105 and 106.

Figure 9D:
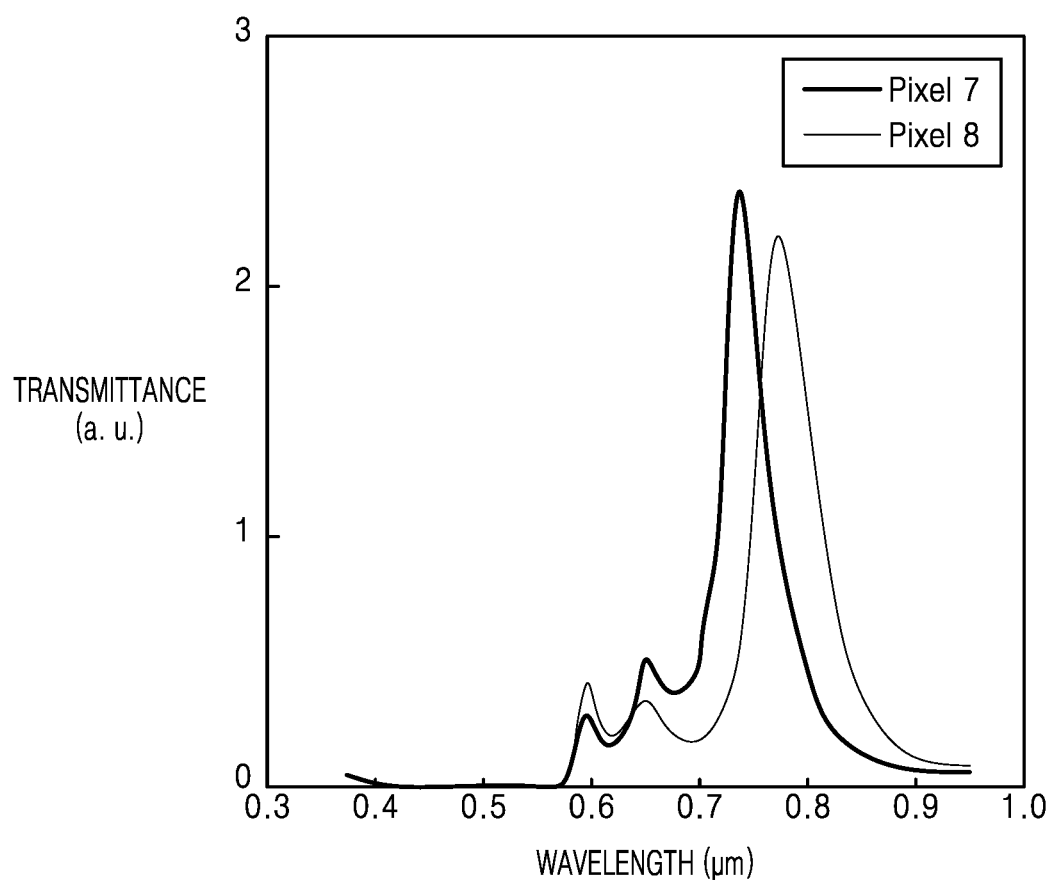
FIG. 9D shows simulation results of absorption spectrums detected in a seventh pixel and a eighth pixel through the spectral filter of FIG. 7.

FIG. 9D shows simulation results of absorption spectrums detected in the seventh pixel 107 and the eighth pixel 108 through the spectral filter 1200 of FIG. 7. Here, a blue color filter is used as the fourth band filter 254. With reference to FIG. 9D, wavelengths of NIR light region are detected in the seventh and eighth pixels 107 and 108.

As described above, according to the embodiment, the spectral filter 1200 having broadband characteristics ranging from, for example, ultraviolet ray to NIR may be implemented. The foregoing embodiments describe a case where the bandpass filter 250 includes four band filters (i.e., the first to fourth band filters 251 to 254); however, the present disclosure is not limited thereto, and the bandpass filter 250 may include various numbers of band filters. Moreover, although the foregoing embodiments describe a case where each of the first to fourth band filters 251 to 254 includes two cavities, the present disclosure is not limited thereto, and the number of cavities corresponding to each of the first to fourth band filters 251 to 254 may vary.

Figure 10:
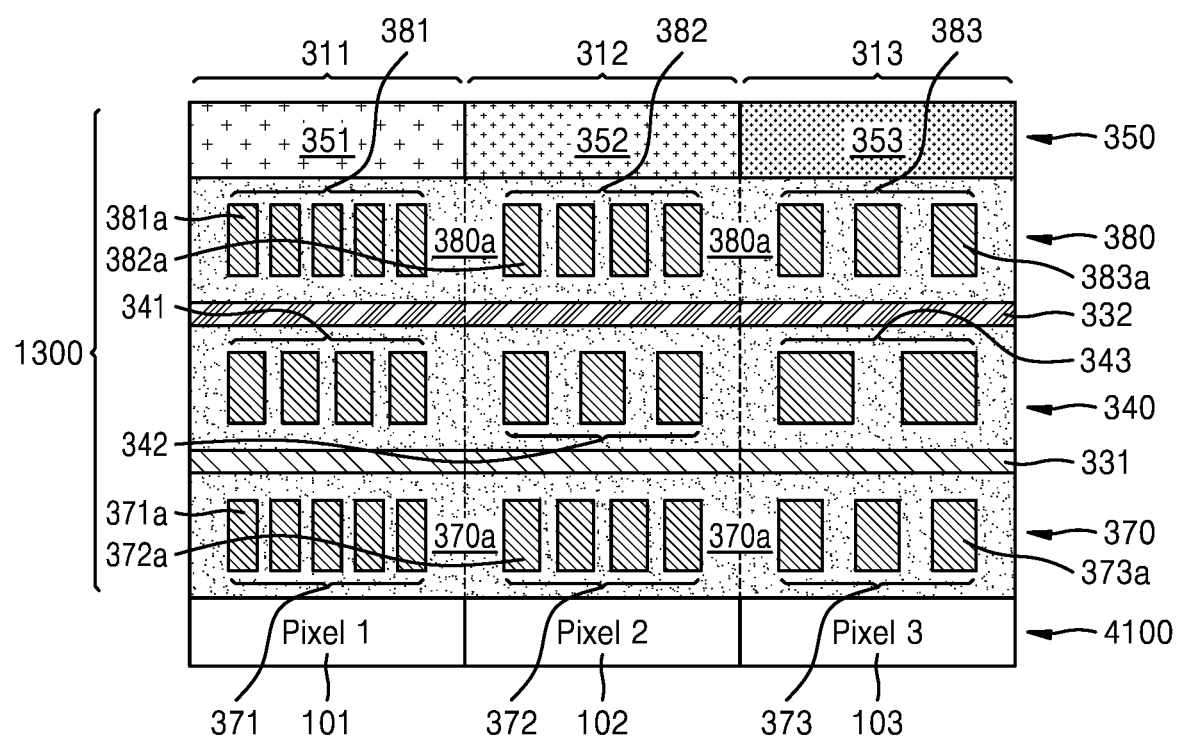
FIG. 10 is a diagram of a spectral filter according to another example embodiment.

FIG. 10 is a diagram of a spectral filter 1300 according to another example embodiment.

With reference to FIG. 10, the spectral filter 1300 may include a plurality of filters (i.e., a first filter 311, a second filter 312, and a third filter 313), and the pixel array 4100 including a plurality of pixels (i.e., the first pixel 101, the second pixel 102, and the third pixel 103) may be disposed under the spectral filter 1300. FIG. 10 illustrates an example of three filters, i.e., the first to third filters 311, 312, and 313.

The first to third filters 311, 312, and 313 may include a resonator 340 and a bandpass filter 350 disposed above the resonator 340. The resonator 340 may include a first cavity 341, a second cavity 342, and a third cavity 343 disposed between a first metal reflection layer 331 and a second metal reflection layer 332. The bandpass filter 350 may include a first band filter 351, a second band filter 352, and a third band filter 353. As the resonator 340 and the bandpass filter 350 are described above, any redundant description thereon is omitted.

A lower dielectric layer 370 may be further provided between the resonator 340 and the pixel array 4100, and an upper dielectric layer 380 may be further provided between the resonator 340 and the bandpass filter 350. The lower and upper dielectric layers 370 and 380 may improve the transmittance of the spectral filter 1300. The lower and upper dielectric layers 370 and 380 may include, for example, titanium oxide, silicon nitride, hafnium oxide, silicon oxide, high index polymer, etc. However, the foregoing is provided only as an example.

A first dielectric layer 371 and a second dielectric layer 381 may be provided below and above the first cavity 341, respectively. The first and second dielectric layers 371 and 381 may improve the transmittance of the first filter 311. For example, the first and second dielectric layers 371 and 381 may improve the transmittance of the first wavelength region.

Each of the first and second dielectric layers 371 and 381 may include dielectric materials having different refractive indexes. Specifically, the first dielectric layer 371 may include a base 370a and at least one first pattern 371a disposed in the base 370a in a certain shape, and the second dielectric layer 381 may include a base 380a and at least one first pattern 381a disposed in the base 380a in a certain shape. An effective refractive index of each of the first and second dielectric layers 371 and 381 may be determined according to the material of the bases 370a and 380a, the material of the first patterns 371a and 381a, a content of the material of the first patterns 371a and 381a, etc.

A third dielectric layer 372 and a fourth dielectric layer 382 may be provided below and above the second cavity 342, respectively. The third and fourth dielectric layers 372 and 382 may improve the transmittance of the second filter 312. For example, the third and fourth dielectric layers 372 and 382 may improve the transmittance of the second wavelength region. The third and fourth dielectric layers 372 and 382 may have an effective refractive index different from that of the first and second dielectric layers 371 and 381. The third dielectric layer 372 may include the base 370a and at least one second pattern 372a disposed in the base 370a in a certain shape, and the fourth dielectric layer 382 may include the base 380a and at least one second pattern 382a disposed in the base 380a in a certain shape. An effective refractive index of each of the third and fourth dielectric layers 372 and 382 may be determined according to the material of the bases 370a and 380a, the material of the second patterns 372a and 382a, a content of the material of the second patterns 372a and 382a, etc.

A fifth dielectric layer 373 and a sixth dielectric layer 383 may be provided below and above the third cavity 343, respectively. The fifth and sixth dielectric layers 373 and 383 may improve the transmittance of the third filter 313. For example, the fifth and sixth dielectric layers 373 and 383 may improve the transmittance of the third wavelength region. The fifth and sixth dielectric layers 373 and 383 may have an effective refractive index different from those of the first and second dielectric layers 371 and 381 and third and fourth dielectric layers 372 and 382. The fifth dielectric layer 373 may include the base 370a and at least one third pattern 373a disposed in the base 370a in a certain shape, and the sixth dielectric layer 383 may include the base 380a and at least one third pattern 383a disposed in the base 380a in a certain shape. An effective refractive index of each of the fifth and sixth dielectric layers 373 and 383 may be determined according to the material of the bases 370a and 380a, the material of the third patterns 373a and 383a, a content of the material of the third patterns 373a and 383a, etc.

Figure 11:
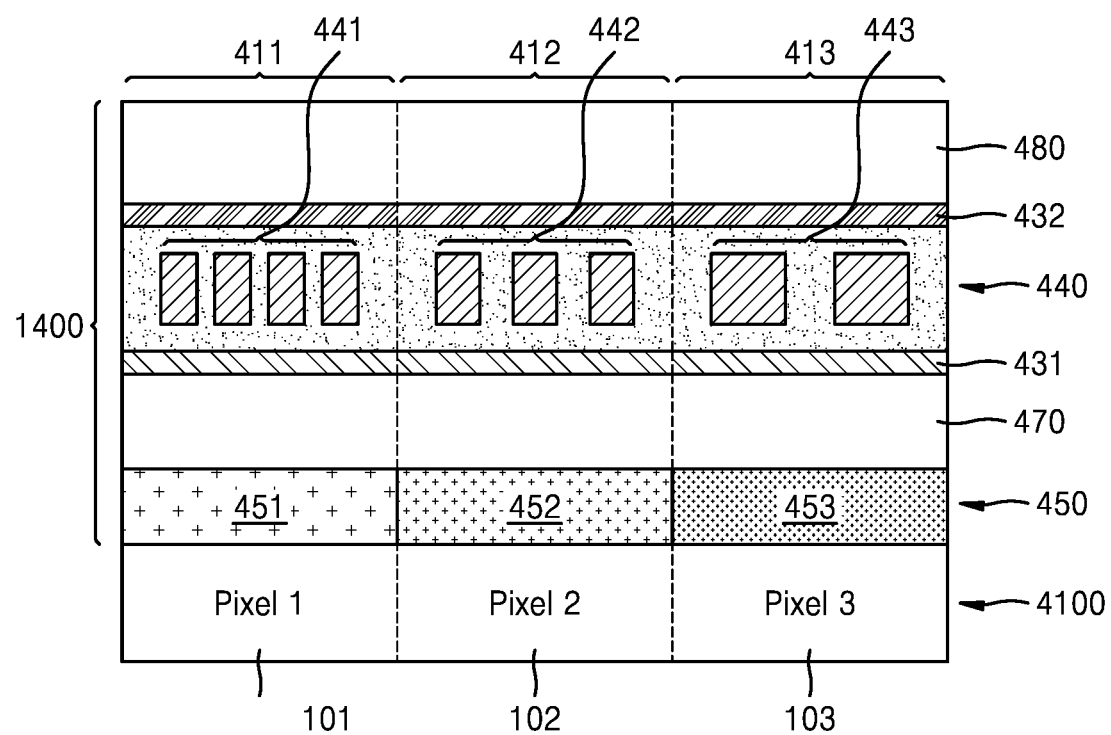
FIG. 11 is a diagram of a spectral filter according to another example embodiment.

FIG. 11 is a diagram of a spectral filter 1400 according to another example embodiment. The spectral filter 1400 of FIG. 11 may be identical to the spectral filter 1100 of FIG. 2 except for a bandpass filter 450 disposed below a resonator 440.

With reference to FIG. 11, the spectral filter 1400 may include a plurality of filters (i.e., a first filter 411, a second filter 412, and a third filter 413), and the pixel array 4100 including a plurality of pixels (i.e., the first pixel 101, the second pixel 102, and the third pixel 103) may be disposed under the spectral filter 1400.

The first to third filters 411, 412, and 413 may include the resonator 440 and the bandpass filter 450 disposed below the resonator 440. The resonator 440 may include a first cavity 441, a second cavity 442, and a third cavity 443 disposed between a first metal reflection layer 431 and a second metal reflection layer 432. The bandpass filter 450 may include a first band filter 451, a second band filter 452, and a third band filter 453. As the resonator 440 and the bandpass filter 450 are described above, any redundant description thereon is omitted.

A lower dielectric layer 470 may be provided below the resonator 440, and an upper dielectric layer 480 may be provided above the resonator 440. The lower and upper dielectric layers 470 and 480 may include the lower and upper dielectric layers 370 and 380 of FIG. 10 to improve the transmittance of the spectral filter 1300.

Figure 12:
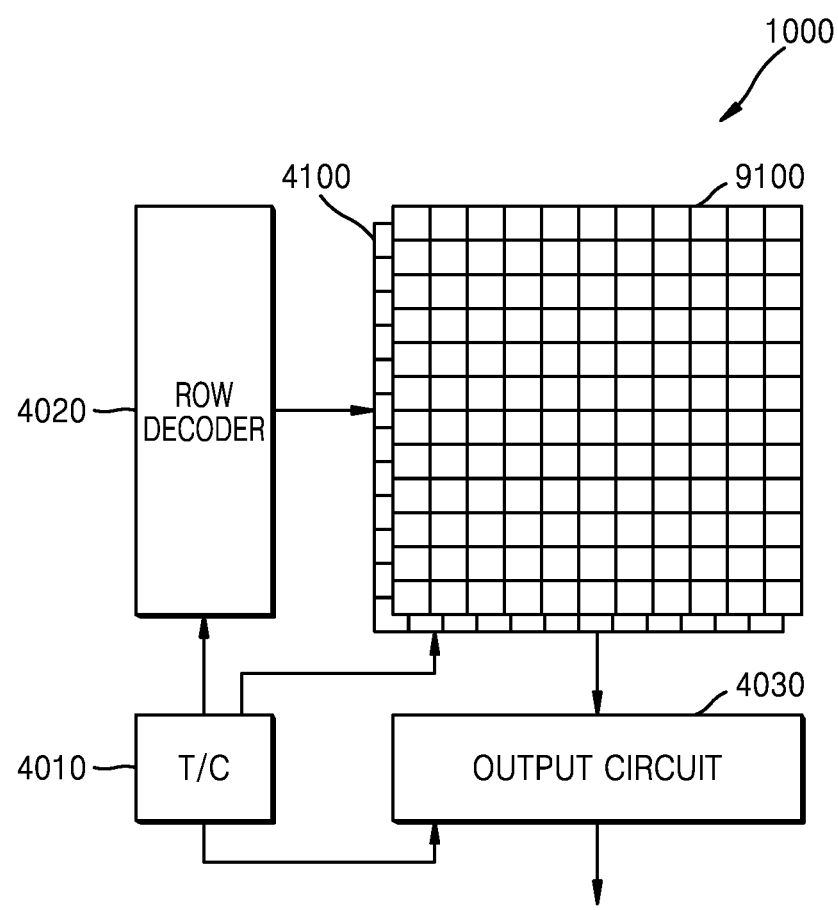
FIG. 12 is a block diagram of an image sensor according to an example embodiment.

FIG. 12 is a schematic block diagram of the image sensor 1000 according to an example embodiment.

With reference to FIG. 12, the image sensor 1000 may include a spectral filter 9100, a pixel array 4100, a timing controller 4010, a row decoder 4020, and an output circuit 4030. The spectral filter 9100 may include a plurality of filters transmitting light of different wavelength regions and disposed in a 2D manner. The pixel array 4100 may include a plurality of pixels that detect light of different wavelengths transmitted through the plurality of filters. In detail, the pixel array 4100 may include pixels disposed in a 2D manner along a plurality of rows and columns. The row decoder 4020 may select one of the rows of the pixel array 4100 in response to a row address signal output from the timing controller 4010. The output circuit 4030 may output a light detection signal in units of columns from the pixels disposed along a selected row. To this end, the output circuit 4030 may include a column decoder and an analog to digital converter (ADC). For example, the output circuit 4030 may include a plurality of ADCs disposed for each column between the column decoder and the pixel array 4100, or a single ADC disposed at an output end of the column decoder. The timing controller 4010, the row decoder 4020, and the output circuit 4030 may be implemented as a single chip or separate chips. A processor for processing an image signal output through the output circuit 4030 may be implemented as a single chip with the timing controller 4010, the row decoder 4020, and the output circuit 4030. The pixel array 4100 may include a plurality of pixels that detect light of different wavelengths, and the pixels may be disposed in various ways.

Figure 13:
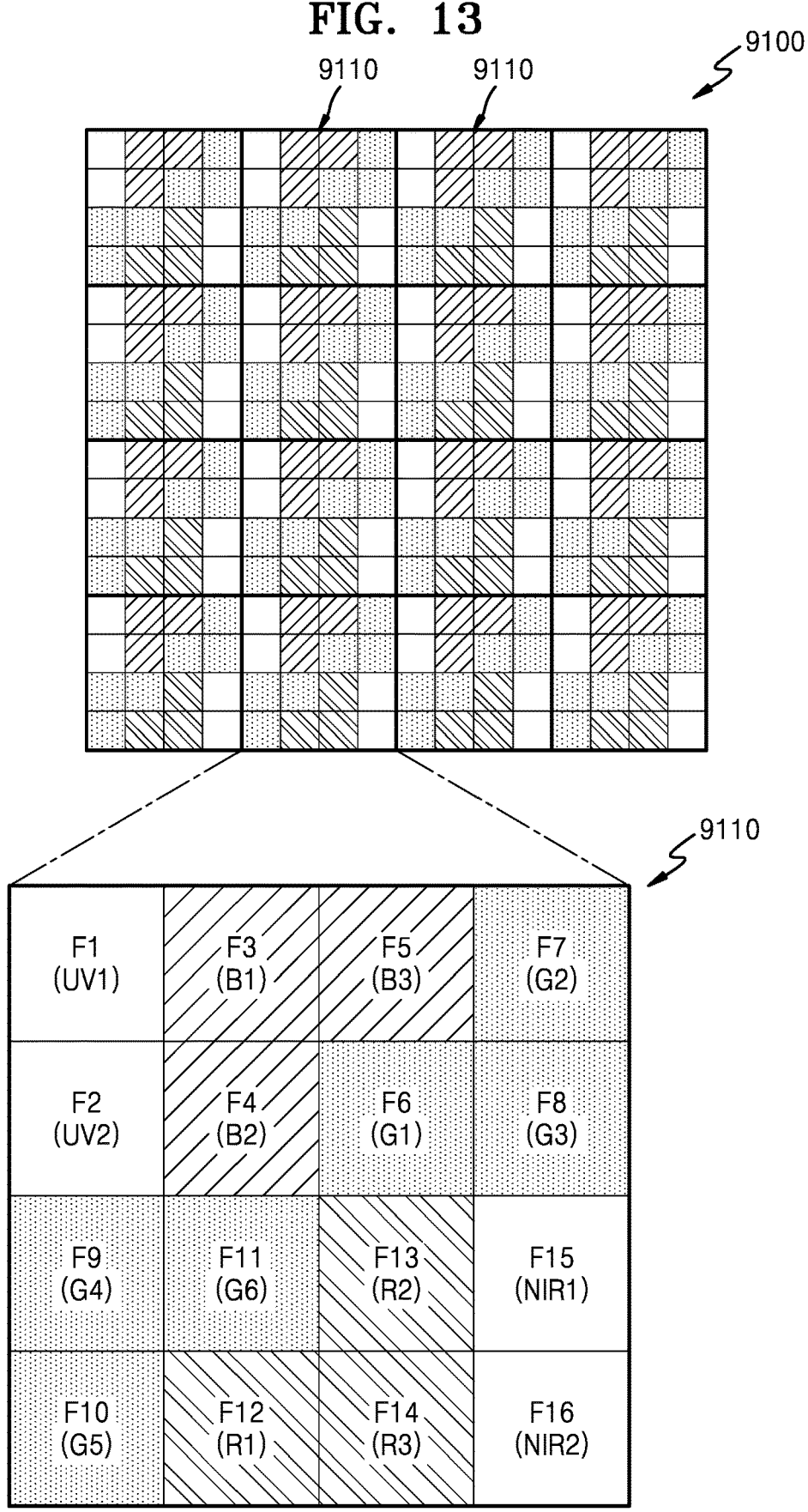
FIG. 13 is a plan view of an example of a spectral filter applicable to the image sensor of FIG. 12.

FIG. 13 is a plan view of an example of the spectral filter 9100 applicable to the image sensor 1100 of FIG. 12.

With reference to FIG. 13, the spectral filter 9100 may include a plurality of filter groups 9110 disposed in a 2D manner. Each of the filter groups 9110 may include sixteen filters (i.e., a first filter F1, a second filter F2, a third filter F3, a fourth filter F4, a fifth filter F5, a sixth filter F6, a seventh filter F7, an eighth filter F8, a ninth filter F9, a tenth filter F10, an eleventh filter F11, a twelfth filter F12, a thirteenth filter F13, a fourteenth filter F14, a fifteenth filter F15, and a sixteenth filter F16) disposed in a 4×4 array.

The first and second filters F1 and F2 may have central wavelengths UV1 and UV2 of an ultraviolet region, and the third to fifth filters F3 to F5 may have central wavelengths B1 to B3 of a blue light region. The sixth to eleventh filter F6 to F11 may have central wavelengths G1 to G6 of a green light region, and the twelfth to fourteenth filters F12 to F14 may have central wavelengths R1 to R3 of a red light region. The fifteenth and sixteenth filters F15 and F16 may have central wavelengths NIR1 and NIR2 if an NIR region.

Figure 14:
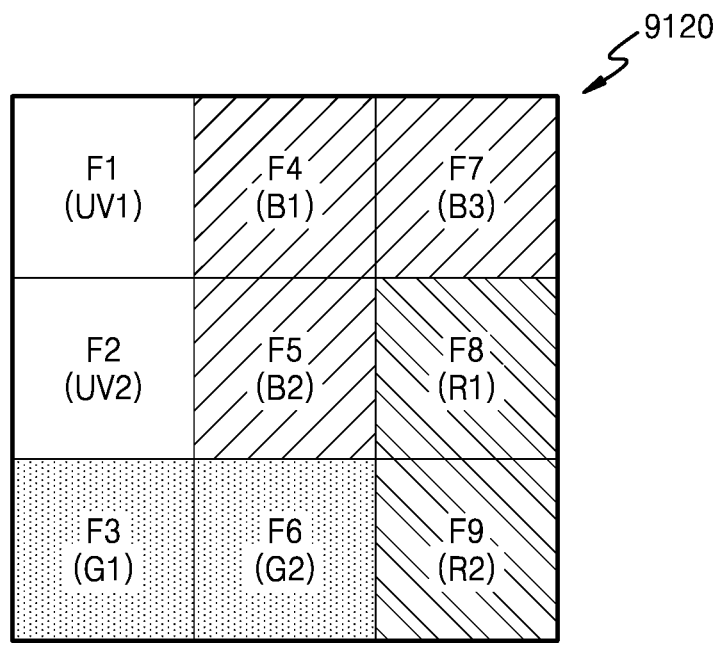
FIG. 14 is a plan view of another example of a spectral filter applicable to the image sensor of FIG. 12.

FIG. 14 is a plan view of another example of the spectral filter 9100 applicable to the image sensor of FIG. 12. FIG. 14 is a plan view of one filter group 9120, for convenience of explanation.

With reference to FIG. 14, each filter group 9120 may include nine filters (i.e., the first to ninth filters F1 to F9) disposed in a 3×3 array. The first and second filters F1 and F2 may have central wavelengths UV1 and UV2 of the ultraviolet region, and the fourth, fifth, and seventh filter F4, F5, and F7 may have central wavelengths B1 to B3 of the blue light region. The third and sixth filters F3 and F6 may have central wavelengths G1 and G2 of the green light region, and the eighth and ninth filters F8 and F9 may have central wavelengths R1 and R2 of the red light region.

FIG. 15 is a plan view of another example of the spectral filter 9100 applicable to the image sensor of FIG. 12. FIG. 15 is a plan view of one filter group 9130, for convenience of explanation.

With reference to FIG. 15, each filter group 9130 may include twenty-five filters (i.e., the first to sixteenth filters F1 to F16, a seventeenth filter F17, an eighteenth filter F18, a nineteenth filter F19, a twentieth filter F20, a twenty-first filter F21, a twenty-second filter F22, a twenty-third filter F23, a twenty-fourth filter F24, and a twenty-fifth filter F25) disposed in a 5×5 array. The first to third filter F1 to F3 may have central wavelengths UV1 to UV3 of the ultraviolet region, and the sixth, seventh, eighth, eleventh, and twelfth filters F6, F7, F8, F11, and F12 may have central wavelengths B1 to B5 of the blue light region. The fourth, fifth, and ninth filters F4, F5, and F9 may have central wavelengths G1 to G3 of the green light region, and the tenth, thirteenth, fourteenth, fifteenth, eighteenth, and nineteenth filters F10, F13, F14, F15, F18, and F19 may have central wavelengths R1 to R6 of the red light region. The twentieth, twenty-third twenty-fourth, and twenty-fifth filters F20, F23, F24, and F25 may have central wavelengths NIR1 to NIR4 of the NIR region.

The image sensor 1000 having the above-described spectral filter may be employed in various high performance optical devices or high performance electronic devices. The electronic devices may include, for example, smartphones, mobile phones, cellular phones, personal digital assistants (PDAs), laptop computers, personal computers (PCs), various portable devices, home appliances, security cameras, medical cameras, automobiles, Internet of Things (IoT) devices, and other mobile or non-mobile computing devices, but the disclosure is not limited thereto.

The electronic devices may further include, in addition to the image sensor 1000, a processor for controlling an image sensor, for example, an application processor (AP), control a number of hardware or software constituent elements by driving operating systems or application programs through the processor, and perform various data processing and calculations. The processors may further include graphics processing units (GPUs) and/or image signal processors. When the processors include image signal processors, an image (or video) obtained through an image sensor may be stored and/or output using the processor.

Figure 16:
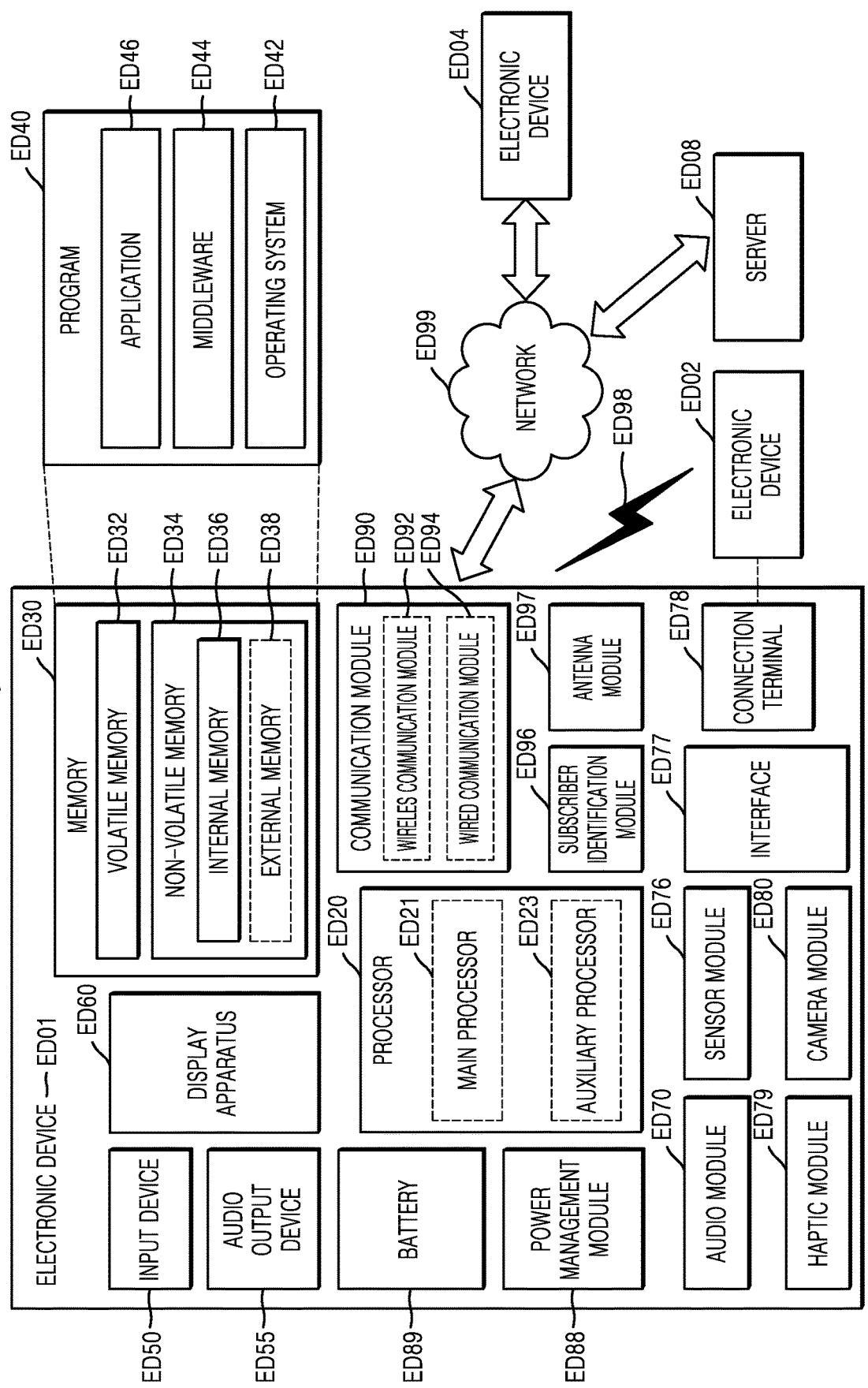
FIG. 16 is a schematic block diagram of an electronic device including an image sensor, according to example embodiments.

FIG. 16 is a schematic block diagram of an electronic device ED01 including the image sensor 1000. With reference to FIG. 16, in a network environment ED00, the electronic device ED01 may communicate with another electronic device ED02 through a first network ED98 (e.g., short-range wireless communication network, etc.), or communicate with another electronic device ED04 and/or a server ED08 through a second network ED99 (e.g., long-range wireless communication network, etc.) The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (e.g., the display device ED60, etc.) of constituent elements may be omitted or other constituent elements may be added. Some of the constituent elements may be implemented as one integrated circuit. For example, the sensor module ED76 (e.g., a fingerprint sensor, an iris sensor, an illuminance sensor, etc.) may be implemented by being embedded in the display device ED60 (e.g., a display, etc.) Furthermore, when the image sensor 1000 includes a spectral function, some functions (e.g., a color sensor and an illuminance sensor) of the sensor module ED76 may be implemented by the image sensor 1000, not by a separate sensor module.

The processor ED20 may control one or a plurality of other constituent elements (e.g., hardware and software constituent elements, etc.) of the electronic device ED01 connected to the processor ED20 by executing software (e.g., a program ED40, etc.), and perform various data processing or calculations. As a part of the data processing or calculations, the processor ED20 may load, in a volatile memory ED32, commands and/or data received from other constituent elements (e.g., the sensor module ED76, the communication module ED90, etc.), process the command and/or data stored in the volatile memory ED32, and store result data in a non-volatile memory ED34. The processor ED20 may include a main processor ED21 (e.g., a central processing unit, an application processor, etc.) and an auxiliary processor ED23 (e.g., a graphics processing unit, an image signal processor, a sensor hub processor, a communication processor, etc.) that is operable independently of or together with the main processor ED21. The auxiliary processor ED23 may use less power than the main processor ED21 and may perform a specialized function.

Instead of the main processor ED21 when the main processor ED21 is in an inactive state (i.e., a sleep state), or with the main processor ED21 when the main processor ED21 is in an active state (i.e., an application execution state), the auxiliary processor ED23 may control functions and/or states related to some constituent elements (e.g., the display device ED60, the sensor module ED76, the communication module ED90, etc.) of the constituent elements of the electronic device ED01. The auxiliary processor ED23 (e.g., an image signal processor, a communication processor, etc.) may be implemented as a part of functionally related other constituent elements (e.g., the camera module ED80, the communication module ED90, etc.)

The memory ED30 may store various data needed by the constituent elements (e.g., the processor ED20, the sensor module ED76, etc.) of the electronic device ED01. The data may include, for example, software (e.g., the program ED40, etc.) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for constituent elements (e.g., the processor ED20, etc.) of the electronic device ED01, from the outside (e.g., a user, etc.) of the electronic device ED01. The input device ED50 may include a microphone, a mouse, a keyboard, and/or a digital pen (e.g., a stylus pen, etc.)

The audio output device ED55 may output an audio signal to the outside of the electronic device ED01. The audio output device ED55 may include a speaker and/or a receiver. The speaker may be used for general purposes such as multimedia playback or recording playback, and the receiver may be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (e.g., a pressure sensor, etc.) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (e.g., the electronic device ED02, etc.) connected to the audio output device ED55 and/or the electronic device ED01 in a wired or wireless manner.

The sensor module ED76 may detect an operation state (e.g., power, temperature, etc.) of the electronic device ED01, or an external environment state (e.g., a user state, etc.), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of specified protocols used for the electronic device ED01 to be connected to another electronic device (e.g., the electronic device ED02, etc.) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (e.g., the electronic device ED02, etc.) The connection terminal ED78 may include an HDMI connector, a USB connector, an SD card connector, and/or an audio connector (e.g., a headphone connector, etc.)

The haptic module ED79 may convert electrical signals into mechanical stimuli (e.g., vibrations, movements, etc.) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include a lens assembly including one or a plurality of lenses, the image sensor 1000 of FIG. 1, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management emitter integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a direct (wired) communication channel and/or a wireless communication channel between the electronic device ED01 and another electronic device (e.g., the electronic device ED02, the electronic device ED04, the server ED08, etc.), and support a communication through an established communication channel. The communication module ED90 may be operated independent of the processor ED20 (e.g., the application processor, etc.), and may include one or a plurality of communication processors supporting a wired communication and/or a wireless communication. The communication module ED90 may include a wireless communication module ED92 (e.g., a cellular communication module, a short-range wireless communication module, a global navigation satellite system (GNSS) communication module, etc.), and/or a wired communication module ED94 (e.g., a local area network (LAN) communication module, a power line communication module, etc.) Among the above communication modules, a corresponding communication module may communicate with another electronic device through the first network ED98 (e.g., a short-range communication network such as Bluetooth, WiFi Direct, or infrared data association (IrDA)) or the second network ED99 (e.g., a long-range communication network such as a cellular network, the Internet, or a computer network (LAN, WAN, etc.)) These various types of communication modules may be integrated into one constituent element (e.g., a single chip, etc.), or may be implemented as a plurality of separate constituent elements (e.g., multiple chips). The wireless communication module ED92 may verify and authenticate the electronic device ED01 in a communication network such as the first network ED98 and/or the second network ED99 by using subscriber information (e.g., an international mobile subscriber identifier (IMSI), etc.) stored in the subscriber identification module ED96.

The antenna module ED97 may transmit signals and/or power to the outside (e.g., another electronic device, etc.) or receive signals and/or power from the outside. An antenna may include an emitter formed in a conductive pattern on a substrate (e.g., a printed circuit board (PCB), etc.) The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (e.g., an RFIC, etc.) than the antenna may be included as a part of the antenna module ED97.

Some of the constituent elements may be connected to each other through a communication method between peripheral devices (e.g., a bus, general purpose input and output (GPIO), a serial peripheral interface (SPI), a mobile industry processor interface (MIPI), etc.) and may mutually exchange signals (e.g., commands, data, etc.)

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices ED02, ED04, and ED08. For example, when the electronic device ED01 needs to perform a function or service, the electronic device ED01 may request one or a plurality of electronic devices to perform a part or the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

Figure 17:
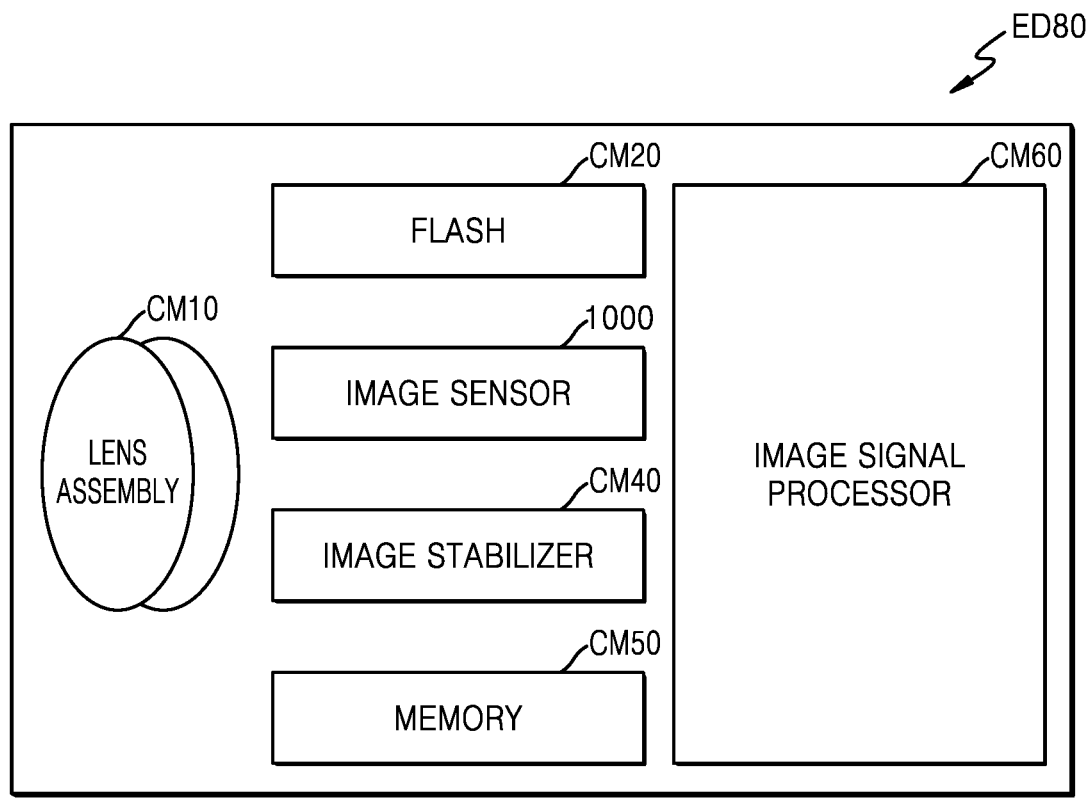
FIG. 17 is a schematic block diagram of the camera module of FIG. 16.

FIG. 17 is a schematic block diagram of the camera module ED80 of FIG. 16. With reference to FIG. 17, the camera module ED80 may include a lens assembly CM10, a flash CM20, the image sensor 1000 (e.g., the image sensor 1000 of FIG. 12, etc.), an image stabilizer CM40, a memory CM50 (e.g., a buffer memory, etc.), and/or an image signal processor CM60. The lens assembly CM10 may collect light emitted from a subject for image capturing. The camera module ED80 may include a plurality of lens assemblies CM10, and in this case, the camera module ED80 may be a dual camera, a 360 degrees camera, or a spherical camera. Some of the lens assemblies CM10 may have the same lens attributes (e.g., a viewing angle, a focal length, auto focus, F Number, optical zoom, etc.), or different lens attributes. The lens assembly CM10 may include a wide angle lens or a telescopic lens.

The flash CM20 may emit light used to reinforce light emitted or reflected from a subject. The flash CM20 may include one or a plurality of light-emitting diodes (e.g., a red-green-blue (RGB) LED, a white LED, an infrared LED, an ultraviolet LED, etc.), and/or a xenon lamp. The image sensor 1000 may include the image sensor of FIG. 1, and convert light emitted or reflected from the subject and transmitted through the lens assembly CM10 into electrical signals, thereby obtaining an image corresponding to the subject. The image sensor 1000 may include one or a plurality of sensors selected from image sensors having different attributes such as an RGB sensor, a black and white (BW) sensor, an IR sensor, or UV sensor. Each sensor included in the image sensor 1000 may be implemented by a charged-coupled device (CCD) sensor and/or a complementary metal oxide semiconductor (CMOS) sensor.

The image stabilizer CM40 may move, in response to a movement of the camera module ED80 or the electronic device ED01 including the same, one or a plurality of lenses included in the lens assembly CM10 or the image sensor 1000 in a particular direction or may compensate for a negative effect due to the movement by controlling (e.g., adjusting a read-out timing, etc.) the movement characteristics of the image sensor 1000. The image stabilizer CM40 may detect a movement of the camera module ED80 or the electronic device ED01 by using a gyro sensor (not shown) or an acceleration sensor (not shown) disposed inside or outside the camera module ED80. The image stabilizer CM40 may be implemented in an optical form.

The memory CM50 may store a part or entire data of an image obtained through the image sensor 1000 for a subsequent image processing operation. For example, when a plurality of images are obtained at high speed, only low resolution images are displayed while the obtained original data (e.g., Bayer-Patterned data, high resolution data, etc.) is stored in the memory CM50. Then, the memory CM50 may be used to transmit the original data of a selected (e.g., user selection, etc.) image to the image signal processor CM60. The memory CM50 may be incorporated into the memory ED30 of the electronic device ED01, or configured to be an independently operated separate memory.

The image signal processor CM60 may perform image processing on the image obtained through the image sensor 1000 or the image data stored in the memory CM50. The image processing may include depth map generation, three-dimensional modeling, panorama generation, feature point extraction, image synthesis, and/or image compensation (e.g., noise reduction, resolution adjustment, brightness adjustment, blurring, sharpening, softening, etc.) The image signal processor CM60 may perform control (e.g., exposure time control, or read-out timing control, etc.) on constituent elements (e.g., the image sensor 1000, etc.) included in the camera module ED80. The image processed by the image signal processor CM60 may be stored again in the memory CM50 for additional processing or provided to external constituent elements (e.g., the memory ED30, the display apparatus ED60, the electronic device ED02, the electronic device ED04, the server ED08, etc.) of the camera module ED80. The image signal processor CM60 may be incorporated into the processor ED20, or configured to be a separate processor operated independently of the processor ED20. When the image signal processor CM60 is configured to be a separate processor from the processor ED20, the image processed by the image signal processor CM60 may undergo additional image processing by the processor ED20 and then displayed through the display apparatus ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

Figure 18:
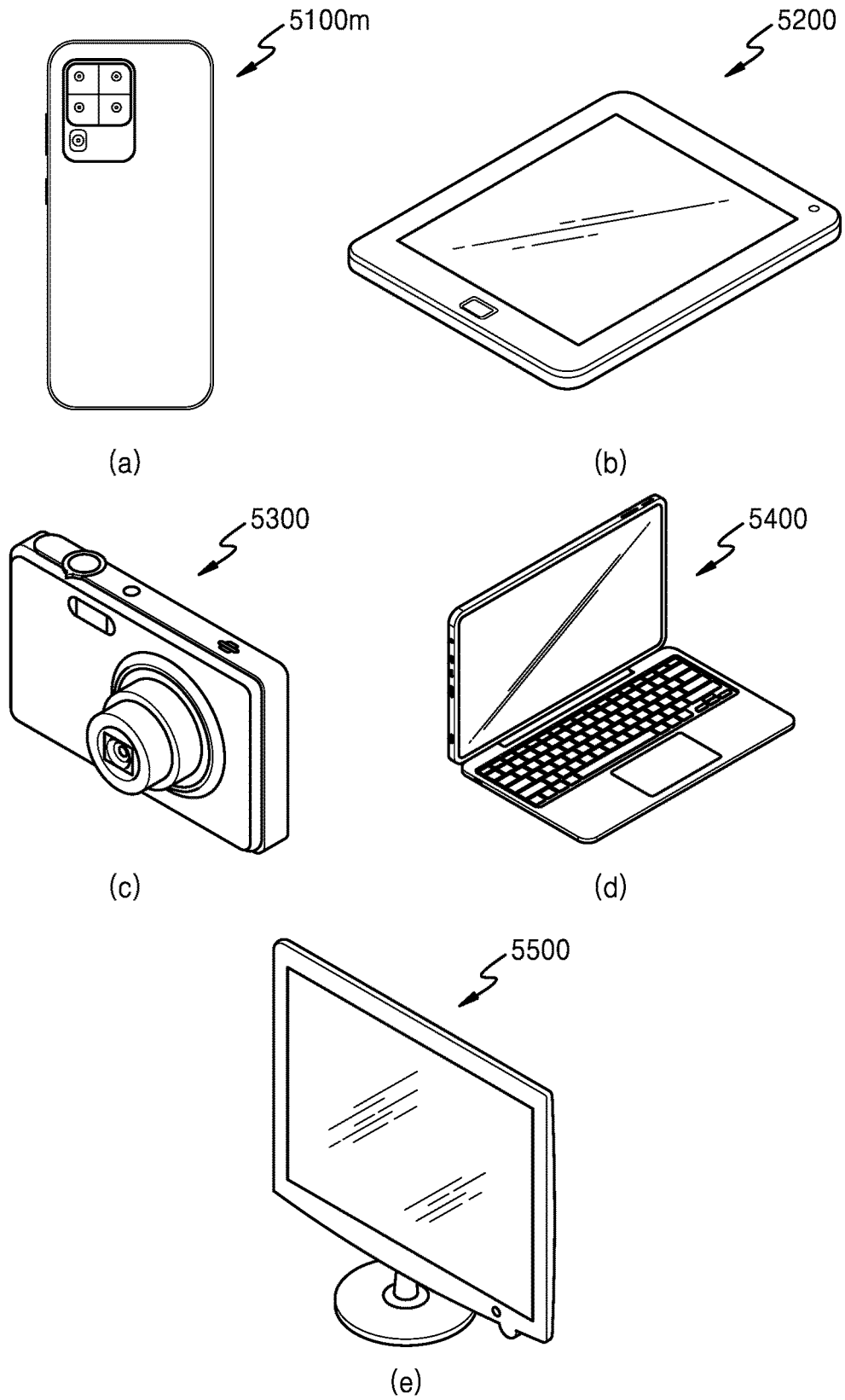
FIGS. 18 to 19 are diagrams of various examples of an electronic device to which image sensors are applied, according to example embodiments.

The image sensor 1000 according to embodiments may be applied to a mobile phone or smartphone 5100m illustrated in (a) of FIG. 18, a tablet or smart tablet 5200 illustrated in (b) of FIG. 18, a digital camera or camcorder 5300 illustrated in (c) of FIG. 18, a notebook computer 5400 illustrated in (d) of FIG. 18, a television or smart television 5500 illustrated in (e) of FIG. 18, etc. For example, the smartphone 5100m or the smart tablet 5200 may include a plurality of high resolution cameras, each having a high resolution image sensor mounted thereon. By using high resolution cameras, depth information of subjects in an image may be extracted, out-focusing of the image may be adjusted, or subjects in the image may be automatically identified.

Figure 19:
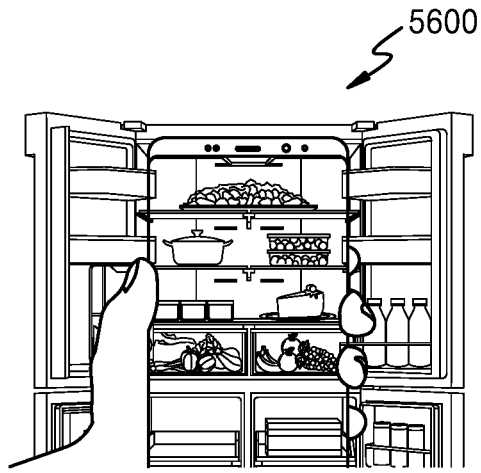
Figure 19:
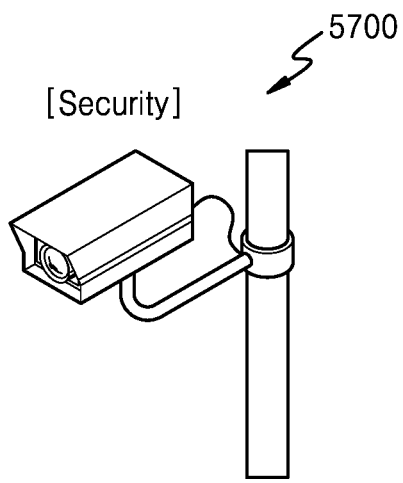
Figure 19:
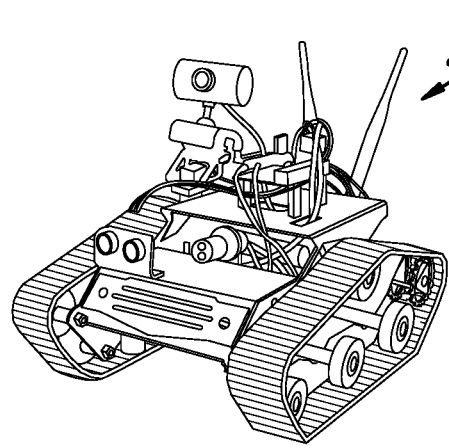
Figure 19:
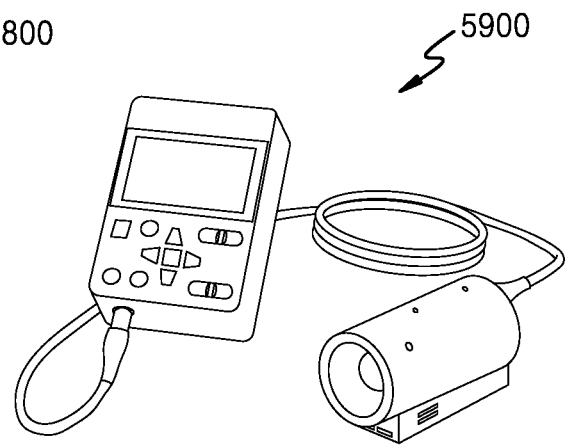
Figure 19:
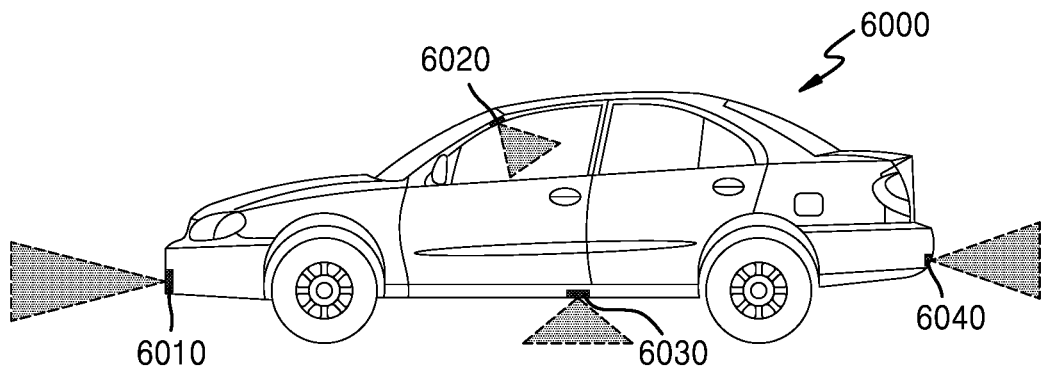

Furthermore, the image sensor 1000 may be applied to a smart refrigerator 5600 illustrated in (a) of FIG. 19, a security camera 5700 illustrated in (b) of FIG. 19, a robot 5800 illustrated in (c) of FIG. 19, a medical camera 5900 illustrated in (d) of FIG. 19, etc. For example, the smart refrigerator 5600 may automatically recognize food in a refrigerator, by using an image sensor, and notify a user of the presence of a particular food, the type of food that is input or output, etc., through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

Furthermore, the image sensor 1000 may be applied to a vehicle 6000 as illustrated in (e) of FIG. 19. The vehicle 6000 may include a plurality of vehicle cameras 6010, 6020, 6030, and 6040 disposed at various positions. Each of the vehicle cameras 6010, 6020, 6030, and 6040 may include an image sensor according to an embodiment. The vehicle 6000 may provide a driver with various pieces of information about the inside or periphery of the vehicle 6000, by using the vehicle cameras 6010, 6020, 6030, and 6040, and thus an object or a person in an image may be automatically recognized and information needed for autonomous driving may be provided.

According to an example embodiment, by combining a multi-mode cavity having a plurality of central wavelengths with a bandpass filter transmitting only light of a particular wavelength region, a spectral filter having broadband characteristics capable of detecting light of a desired wavelength may be implemented. Moreover, by forming multi-mode cavities in the same thickness, a spectral filter may be manufactured by a simpler process. According to another example embodiment, an image sensor including the aforementioned spectral filter and an electronic device including the image sensor may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spectral filter comprising:
a first metal reflection layer;
a second metal reflection layer disposed above the first metal reflection layer;
a plurality of resonators disposed between the first metal reflection layer and the second metal reflection layer; and
a bandpass filter disposed below the first metal reflection layer or above the second metal reflection layer, the bandpass filter comprising a plurality of band filters transmitting light in a plurality of wavelength regions,
wherein the plurality of band filters are disposed in one-to-one correspondence to the plurality of resonators that are configured to transmit light having a central wavelength,
wherein each of the plurality of band filters transmit light in a corresponding wavelength region,
wherein each of the plurality of resonators, corresponding to each of the plurality of band filters, outputs the light having the central wavelength in the corresponding wavelength region of the corresponding band filter among the plurality of band filters,
wherein each of the plurality of resonators comprises a base and at least one pattern disposed in the base, a material of the base being different from a material of the at least one pattern.

2. The spectral filter of claim 1, wherein the bandpass filter is a color filter or a broadband filter.

3. The spectral filter of claim 1, wherein the plurality of band filters comprises a first band filter configured to transmit light in a first wavelength region, a second band filter configured to transmit light in a second wavelength region, and a third band filter configured to transmit light in a third wavelength region.

4. The spectral filter of claim 3, wherein the plurality of resonators comprises a first cavity corresponding to the first band filter, a second cavity corresponding to the second band filter, and a third cavity corresponding to the third band filter.

5. The spectral filter of claim 4, wherein the first cavity has a first plurality of central wavelengths including a central wavelength in the first wavelength region, the second cavity has a second plurality of central wavelengths including a central wavelength in the second wavelength region, and the third cavity has a third plurality of central wavelengths including a central wavelength in the third wavelength region.

6. The spectral filter of claim 4, wherein a refractive index of the first cavity, a refractive index of the second cavity, and a refractive index of the third cavity are different.

7. The spectral filter of claim 6, wherein a thickness of the first cavity, a thickness of the second cavity, and a thickness of the third cavity are same.

8. The spectral filter of claim 7, wherein the thickness of the first cavity, the second cavity, and the third cavity are greater than or equal to 200 nm and less than or equal to 1000 nm.

9. The spectral filter of claim 1, wherein the base of each of the first, the second and the third resonators comprises titanium oxide.

10. The spectral filter of claim 1, wherein the base of each of the first, the second and the third resonators comprises silicon nitride or hafnium oxide.

11. The spectral filter of claim 1, wherein the first metal reflection layer comprises a first metal material and the second metal reflection layer comprises a second metal material, and wherein the first and the second metal materials are same or different.

12. The spectral filter of claim 11, wherein the first metal reflection layer or the second metal reflection layer comprises Al, Cu, Ag, Au, Ti, W, or TiN.

13. The spectral filter of claim 12, wherein the first metal reflection layer or the second metal reflection layer further comprises poly-Si.

14. The spectral filter of claim 1, wherein a thickness of the first metal reflection layer and a thickness of the second metal reflection layer are 10 nm to 80 nm.

15. The spectral filter of claim 1, further comprising a plurality of dielectric layers disposed above or below the plurality of resonators and having a plurality of different effective refractive indexes.

16. An image sensor comprising:
a spectral filter; and
a pixel array receiving light transmitted through the spectral filter,
wherein the spectral filter comprises:
a first metal reflection layer;
a second metal reflection layer disposed above the first metal reflection layer;
a plurality of resonators disposed between the first metal reflection layer and the second metal reflection layer; and
a bandpass filter disposed below the first metal reflection layer or above the second metal reflection layer, the bandpass filter comprising a plurality of band filters transmitting light in a plurality of wavelength regions,
wherein the plurality of band filters are disposed in one-to-one correspondence to the plurality of resonators,
wherein each of the plurality of band filters transmits light in a corresponding wavelength region having a central wavelength,
wherein each of the plurality of resonators, corresponding to each of the plurality of band filters, outputs light of a central wavelength in the corresponding wavelength region of the corresponding band filter among the plurality of band filters,
wherein each of the plurality of resonators comprises a base and at least one pattern disposed in the base, a material of the base being different from a material of the at least one pattern.

17. The image sensor of claim 16, wherein the pixel array comprises a plurality of pixels, and each of the plurality of pixels comprising a wiring layer including a driver circuit and a photodiode disposed at the wiring layer.

18. The image sensor of claim 17, wherein the plurality of band filters comprises a first band filter transmitting light in a first wavelength region, a second band filter transmitting light in a second wavelength region, and a third band filter transmitting light in a third wavelength region.

19. The image sensor of claim 18, wherein the plurality of resonators comprises a first cavity corresponding to the first band filter, a second cavity corresponding to the second band filter, and a third cavity corresponding to the third band filter.

20. The image sensor of claim 19, wherein the first cavity has a first plurality of central wavelengths including a central wavelength in the first wavelength region, the second cavity has a second plurality of central wavelengths including a central wavelength in the second wavelength region, and the third cavity has a third plurality of central wavelengths including a central wavelength in the third wavelength region.

21. The image sensor of claim 20, wherein a refractive index of the first cavity, a refractive index of the second cavity, and a refractive index of the third cavity are different.

22. The image sensor of claim 21, wherein a thickness of the first cavity, a thickness of the second cavity, and a thickness of the third cavity are same.

23. The image sensor of claim 16, wherein the spectral filter further comprises a plurality of dielectric layers disposed above or below the plurality of resonators and having a plurality of different effective refractive indexes.

24. The image sensor of claim 16, further comprising a timing controller, a row decoder, and an output circuit.

25. An electronic device comprising the image sensor of claim 16.

26. The electronic device of claim 25, wherein the electronic device comprises a mobile phone, a smartphone, a tablet, a smart tablet, a digital camera, a camcorder, a notebook computer, a television, a smart television, a smart refrigerator, a security camera, a robot, or a medical camera.

* * * * *